United States Patent [19]

Eucker et al.

[11] Patent Number: 5,057,001

[45] Date of Patent: Oct. 15, 1991

[54] APPARATUS FOR MAKING CERAMIC TUBES

[75] Inventors: James L. Eucker, Fairview Park; Robert C. Ruhl, Cleveland Heights, both of Ohio; Irving B. Ruppel, Jr., Kenmore, N.Y.

[73] Assignee: The Carborundum Company, Niagara Falls, N.Y.

[21] Appl. No.: 322,482

[22] Filed: Mar. 10, 1989

[51] Int. Cl.[5] ...................... B29C 47/88; B29C 35/02; B29C 35/16

[52] U.S. Cl. .................................. 425/315; 425/378.1

[58] Field of Search ...................... 425/72.1, 308, 315, 425/378.1; 266/255

[56] References Cited

U.S. PATENT DOCUMENTS

| | | | |
|---|---|---|---|
| 2,768,277 | 10/1956 | Buck et al. | 266/255 |
| 3,744,946 | 7/1973 | Lang | 425/72.1 |
| 3,950,463 | 4/1976 | Jones | 264/57 |
| 4,124,667 | 11/1978 | Coppola et al. | 264/29.5 |
| 4,144,207 | 3/1979 | Ohnsorg | 523/209 |
| 4,179,299 | 12/1979 | Coppola et al. | 501/90 |
| 4,207,226 | 6/1980 | Storm | 524/127 |
| 4,233,256 | 11/1980 | Ohnsorg | 264/44 |
| 4,265,843 | 5/1981 | Dias et al. | 264/57 |
| 4,312,954 | 1/1982 | Coppola et al. | 501/90 |
| 4,346,049 | 8/1982 | Coppola et al. | 264/65 |
| 4,496,501 | 1/1985 | Linke et al. | 425/308 |
| 4,810,458 | 3/1989 | Oshima et al. | 425/72.1 |

*Primary Examiner*—Willard E. Hoag

*Attorney, Agent, or Firm*—Weston, Hurd, Fallon, Paisley & Howley

[57] ABSTRACT

Apparatus for making ceramic tubes from a mixture that includes ceramic powder. The mixture is extruded through a die to form a tube. The tube is passed through an open-ended dryer, calciner, transition zone, sintering furnace, and cooler. Thereafter, the tube is cut to the desired length (which may be very long). The quality of the tube is enhanced by applying a vacuum to the mixture prior to extrusion. For tubes made of non-oxide ceramics, an inert atmosphere is maintained both inside and outside the tube in all sections of the equipment that operate above 200° C. A controlled tension is applied to the tube by means of first pinch rolls disposed downstream of the dryer and second pinch rolls disposed downstream of the cooler.

40 Claims, 17 Drawing Sheets

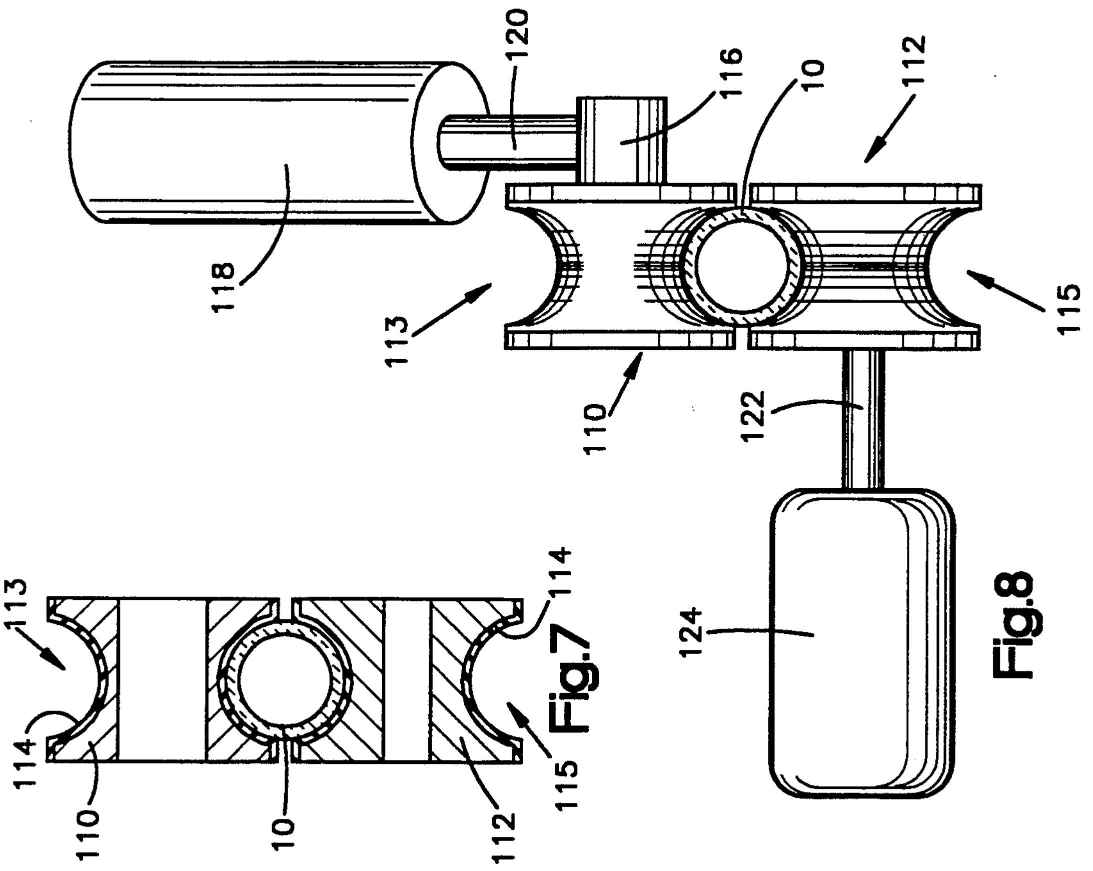
Fig.8
Fig.7
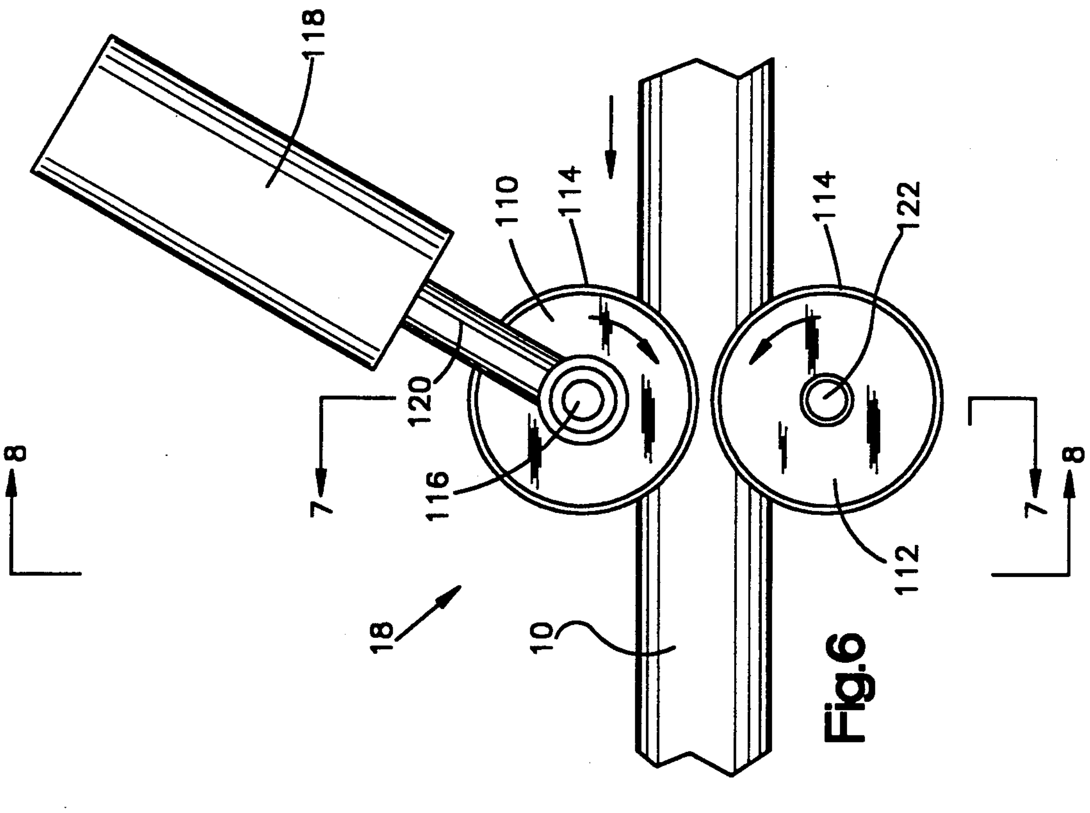
Fig.6

APPARATUS FOR MAKING CERAMIC TUBES

BACKGROUND OF THE INVENTION

1. Field of the Invention

The invention relates to the manufacture of ceramic tubes and, more particularly, to a method and apparatus for manufacturing ceramic tubes on a substantially continuous basis.

2. Description of the Prior Art

Ceramic tubes are used in heat exchangers where corrosive liquids or gases are handled, in high-temperature applications such as recuperators, in certain types of electrolytic cells, and in various other applications. Ceramic tubes currently are manufactured from ceramic materials such as sintered alpha silicon carbide, sintered aluminum oxide, sintered zirconia, and various others. Ceramic tubes are manufactured in a variety of diameters and wall thicknesses, and some currently are manufactured with longitudinal internal fins for enhanced surface area.

Ceramic tubes presently are manufactured by a so-called batch process wherein a series of separate steps are performed upon individual tubes. Unfortunately, batch-produced tubes cannot be manufactured in lengths any longer than approximately 14 feet due to various equipment limitations and to processing limitations including the cumulative length shrinkage. If long tubes (over about 14 feet) are being manufactured, the equipment needed to manufacture the tubes becomes very expensive. Also, it is possible to have differential properties from one end of the tube to the other as the length of the tube is increased. An additional drawback of the batch process is that damage can occur to tubes in process because the tubes must be handled frequently, that is, they must be moved from station-to-station during the manufacturing process. Additional drawbacks associated with batch-manufactured ceramic tubes include a long manufacturing time, the inability to rapidly feed back quality control information from finished tubes to tubes being processed, and a lack of optimum product quality.

Patents disclosing various batch processes for the manufacture of ceramic tubes include the patent to Jones, U.S. Pat. No. 3,950,463, and the patent to Dias, et al., U.S. Pat. No. 4,265,843. Jones discloses the production of beta alumina ceramic tubes wherein tubes of a fixed length, for example 18 inches, are passed at a uniform rate through an electric inductive furnace of open-ended tubular form. The temperature of the tube is raised within a short zone into the range of 1600°-1900° C. so that the tube is rapidly sintered, and thereafter is rapidly cooled. The patent to Dias, et al. similarly operates on tubes of fixed length, for example 20 centimeters. Dias, et al. disclose contacting a fixed length carbon-containing preform with elemental silicon powder at high temperature to transform at least a major part of the carbon to silicon carbide. This is known as reaction bonding, and is considered different from sintering by those skilled in the field of ceramics. Not only do the Jones and Dias et al. manufacturing processes suffer from the drawbacks of batch manufacturing processes, but they also are limited to relatively short lengths of tubes.

Other batch processes are known that are suitable for the manufacture of ceramic tubes, and the use of a variety of materials in such processes also is known. For example, U.S. Pat. Nos. 4,124,667; 4,179,299; 4,312,954; and 4,346,049, all issued to Coppola, et al., the disclosures of which are incorporated herein by reference, disclose sintered alpha silicon carbide ceramic bodies that can be injection molded on a batch basis. The ceramic bodies are manufactured from a mixture including silicon carbide, a carbon source, a boron source, a temporary binder, and a solvent.

The patent to Storm, U.S. Pat. No. 4,207,226 discloses a ceramic composition suited for injection molding and sintering, which composition includes, among other constituents, minor amounts of organo-titanates which materially reduce the viscosity of the composition. The patents to Ohnsorg, U.S. Pat. Nos. 4,144,207 and 4,233,256, disclose a composition and process for injection molding ceramic materials wherein a particular ceramic mixture includes, among other constituents, a combination of thermoplastic resin and oils or waxes. Although the Storm and Ohnsorg patents disclose ceramic compositions having desirable properties, they fail to teach or suggest any technique for overcoming the drawbacks of batch manufacturing processes.

Desirably, it would be possible to manufacture ceramic tubes more or less continuously so that tubes of essentially endless length could be manufactured and then cut to whatever length (for example, up to 60 feet or more) may be desired. It also would be advantageous to manufacture ceramic tubes by reducing handling damage, by providing a high degree of symmetry to the processing of the tubes at each stage, and by permitting rapid feedback of final product quality data to the early stages of the manufacturing process.

SUMMARY OF THE INVENTION

The present invention overcomes the foregoing drawbacks of the prior art and provides a new and improved method and apparatus for the manufacture of ceramic tubes. The present invention involves the manufacture of ceramic tubes from a mixture that includes ceramic powder. In the preferred embodiment, the ceramic powder is alpha silicon carbide that is mixed with a carbon source and a boron source to form a premix. A water-soluble plasticizer, preferably methylcellulose ether, is added to the premix. A solvent such as water is added as needed to control the viscosity to form an extrudable mixture. The mixture is compacted and evacuated and placed in an extruder. The compacted and evacuated mixture then is extruded through a die containing a central mandrel to produce a tube having a desired cross-sectional configuration and wall thickness. While continuously extruding the mixture, the tube is passed through an open-ended dryer, calciner, transition zone, sintering furnace, and cooler. After passing through the cooler, the tube is cut to length.

The extrusion mixture first is mixed in a high-intensity mixer and then is formed into a solid-cylinder "billet" in a separate press, with much of the air in the billet being evacuated by applying a vacuum to the billet-making press. The billet then is loaded into the extruder and again a vacuum is applied to remove air from the extrusion chamber. During long runs, the entire line is stopped briefly (1-2 minutes) for adding a new billet when required. Alternately, it is contemplated that a screw drive extruder may be used which would eliminate the need to stop the entire line to add new starting material. In this alternative mode, it is contemplated that the extrusion mixture would not have to be compacted; evacuation could be accomplished by applying a vacuum to the input means of the screw drive extruder.

The tube preferably is extruded in a horizontal plane and preferably is supported after extrusion and before drying on a cushion of air. The dryer is operated at about 175° C. air inlet temperature in order to remove water. The calciner is operated at about 550°-600° C. at the exit end in order to vaporize the volatiles. The sintering furnace is operated at about 2250°-2300° C. (depending on the composition of the tube, among other factors) in order to sinter the ceramic powder. The transition zone between the calciner and the sintering furnace isolates the volatiles released in the calciner from the sintering furnace. These volatiles are flushed upstream by flowing an inert atmosphere on both the inside and outside of the tube. An inert atmosphere must be maintained within all parts of the line operating above about 200° C.

Tube straightness is achieved primarily through the use of a series of closely fitting guide tubes from the calciner through the cooling section, with the centerlines of the guide tubes being accurately aligned with one another. The inside diameter of these guide tubes is reduced part way through the sintering furnace to conform to the diameter reduction which occurs during sintering. Proper line tension through the sintering section also is helpful in maintaining straightness. Tension is applied to the tube during the extrusion process by means of first pinch rolls disposed downstream of the dryer and second pinch rolls disposed downstream of the cooler. By appropriately controlling the pinch rolls, and the slippage thereof in respect to the tube, the finished tube will be straight, and it will have a uniform wall thickness and outside diameter.

The tube is cut to length by means of a flying cut-off machine disposed adjacent the tube downstream of the cooler. A clamp grips the tube and moves the cut-off machine together with the tube while a diamond abrasive-type cut-off wheel severs the tube. The severed tube is directed onto a run-out table for subsequent inspection and packaging operations. After the tube has been cut, a long hose equipped with a fitting is connected to the end of the tube being produced, which hose is used to introduce a controlled flow of inert gas into the interior of the tube. The inert gas is passed upstream within the tube and is withdrawn through a vacuum port in the mandrel, thus removing water and volatiles from inside the tube and preventing them from entering the sintering zone. The term "inert" as used herein means that the gas, such as nitrogen or argon, does not react substantially with the tube material at any point in the entire line.

As is apparent from the foregoing description, the invention enables extremely long ceramic tubes to be produced on a more or less continuous basis. The tubes can have a wide variety of diameters and wall thicknesses. Tubes having internal fins also may be produced. The present invention minimizes or eliminates damage from frequent tube handling, improves processing (heat transfer and mass transfer) symmetry, permits rapid feedback as part of the manufacturing process, and avoids the high capital cost of conventional tube manufacturing equipment.

The foregoing features and advantages will be apparent from reviewing the following description and claims, taken in conjunction with the accompanying drawings.

DESCRIPTION OF THE DRAWINGS

FIG. 6 is a schematic, side elevational view of first pinch rolls used as part of the invention;

FIG. 7 is a cross-sectional view of the pinch rolls taken along a plane indicated by line 7—7 in FIG. 6;

FIG. 8 is an end elevational view of the pinch rolls taken along a plane indicated by line 8—8 in FIG. 6;

DESCRIPTION OF THE PREFERRED EMBODIMENT

Figure 1:
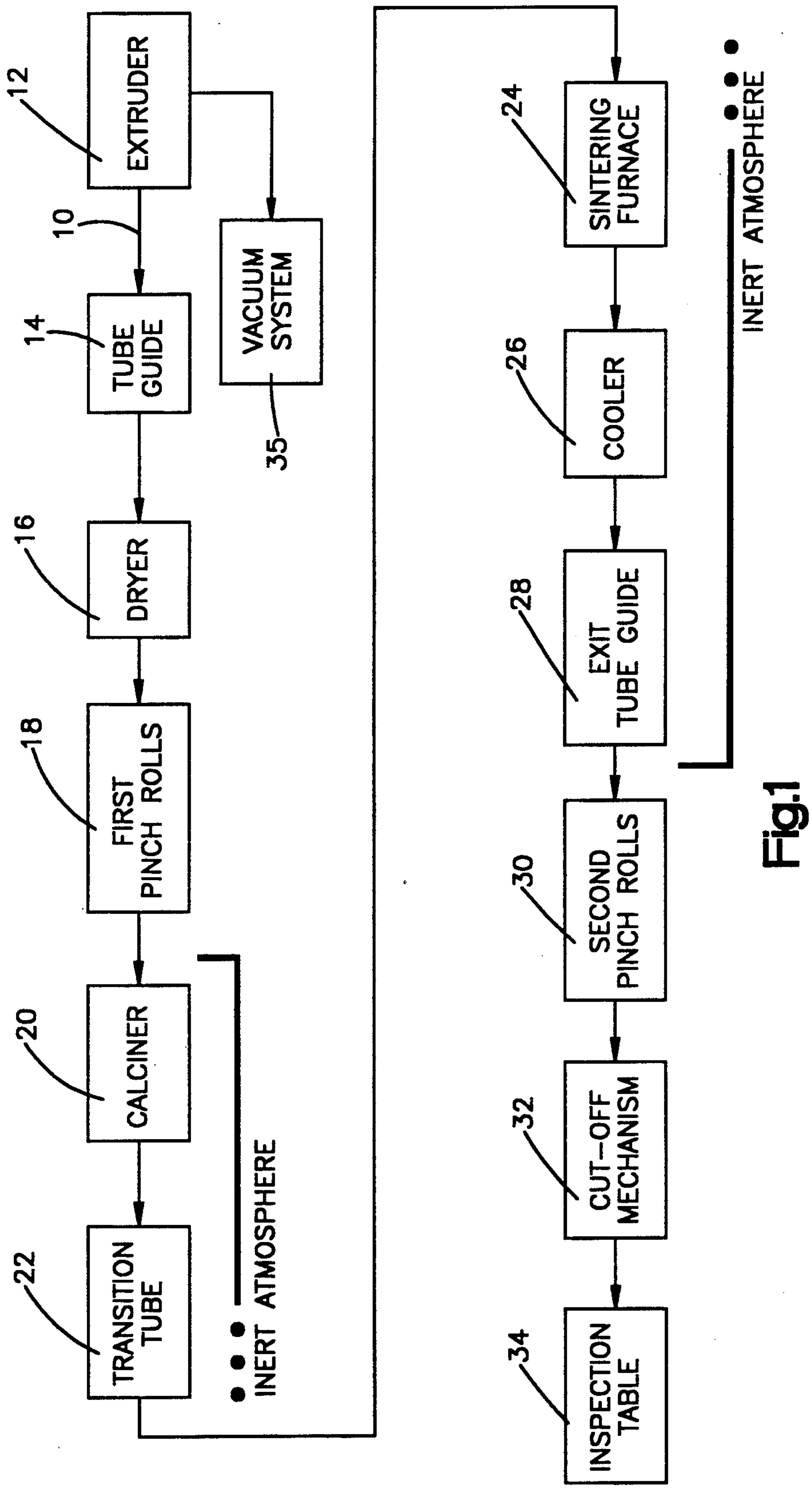
FIG. 1 is a flow chart showing equipment used to manufacture ceramic tubes.

Referring to FIG. 1, apparatus suitable for the manufacture of ceramic tubes 10 is indicated schematically. The tube-making apparatus includes an extruder 12, a tube guide 14, a dryer 16, first pinch rolls 18, a calciner 20, a transition tube 22, a sintering furnace 24, a cooler 26, an exit tube guide 28, second pinch rolls 30, a cut-off mechanism 32, an inspection table 34, and a vacuum system 35. The tube-making apparatus will be described by its individual components, including the composition of the tubes 10.

The Tubes 10

The term "tubes" as used herein primarily refers to elongate cylindrical shapes. The invention can be used to produce other shapes such as solid rods of circular or non-circular cross-section, hollow or solid shapes with external fins, and hollow shapes of circular or non-circular cross-section with internal fins and/or external fins. The invention encompasses all such shapes by the use of the word "tubes".

The sintered alpha silicon carbide tubes 10 are hard, durable, gas-impervious cylinders that can withstand the corrosive and erosive effects of almost any gaseous or liquid material, including high temperature sulfuric acid. Although the tubes in finished form are relatively brittle, they otherwise possess excellent structural integrity and will withstand high temperatures, high pressures, and chemical attack.

The tubes are made from a ceramic material, preferably alpha silicon carbide. Other types of ceramic materials that can be used include aluminum oxide and zirconia. The tubes 10 are sintered, and thus the ceramic powder must be mixed with other ingredients that will enable the powder to be extruded and thereafter sintered. Tubes having a controlled wall porosity also may be manufactured using a pore-forming additive such as carbon. The additive is added to the extrusion mixture and later removed from the finished tubes.

The tubes 10 are manufactured by first making a premix. The premix includes a suitable ceramic powder such as alpha silicon carbide, a suitable sintering aid (boron source) such as boron carbide ($B_4C$), and one or more organic binders, preferably phenolic. The binder also acts as a carbon source to aid in the sintering of the ceramic powder. The premix is a fine, powdery, homogeneous mixture that does not require any special handling or storage precautions. Reference is made to U.S. Pat. Nos. 4,179,299 and 4,312,954 for teachings of particularly desirable alpha silicon carbide premix composition.

A plasticizer is added to the premix to aid in the extrusion process. A preferred plasticizer is methylcellulose ether. Methylcellulose ether is commercially available under the trademark METHOCEL.

The premix-plasticizer mixture is blended with a solvent such as water until a desired viscosity for extrusion is attained. A typical mixture composition would be about 79.6% by weight of silicon carbide premix, 2.1% by weight of A-4M METHOCEL methylcellulose ether, and 18.1% by weight of deionized water. The amount of water in the initial mixture typically is within the range of about 17.0–20.0% by weight. It has been found that if the water is added in the form of ice, or if the mixture is cooled during mixing, then both the green tubes and the sintered tubes have higher density.

The mixture is mixed in a high-intensity mixer and then is formed into a solid-cylinder "billet" in a separate press, with much of the air in the billet being evacuated by applying a vacuum to the billet-making press. A typical billet weights at least 10 pounds and one or two billets usually are charged into the extruder 12 at one time.

The Extruder 12

Figure 2:
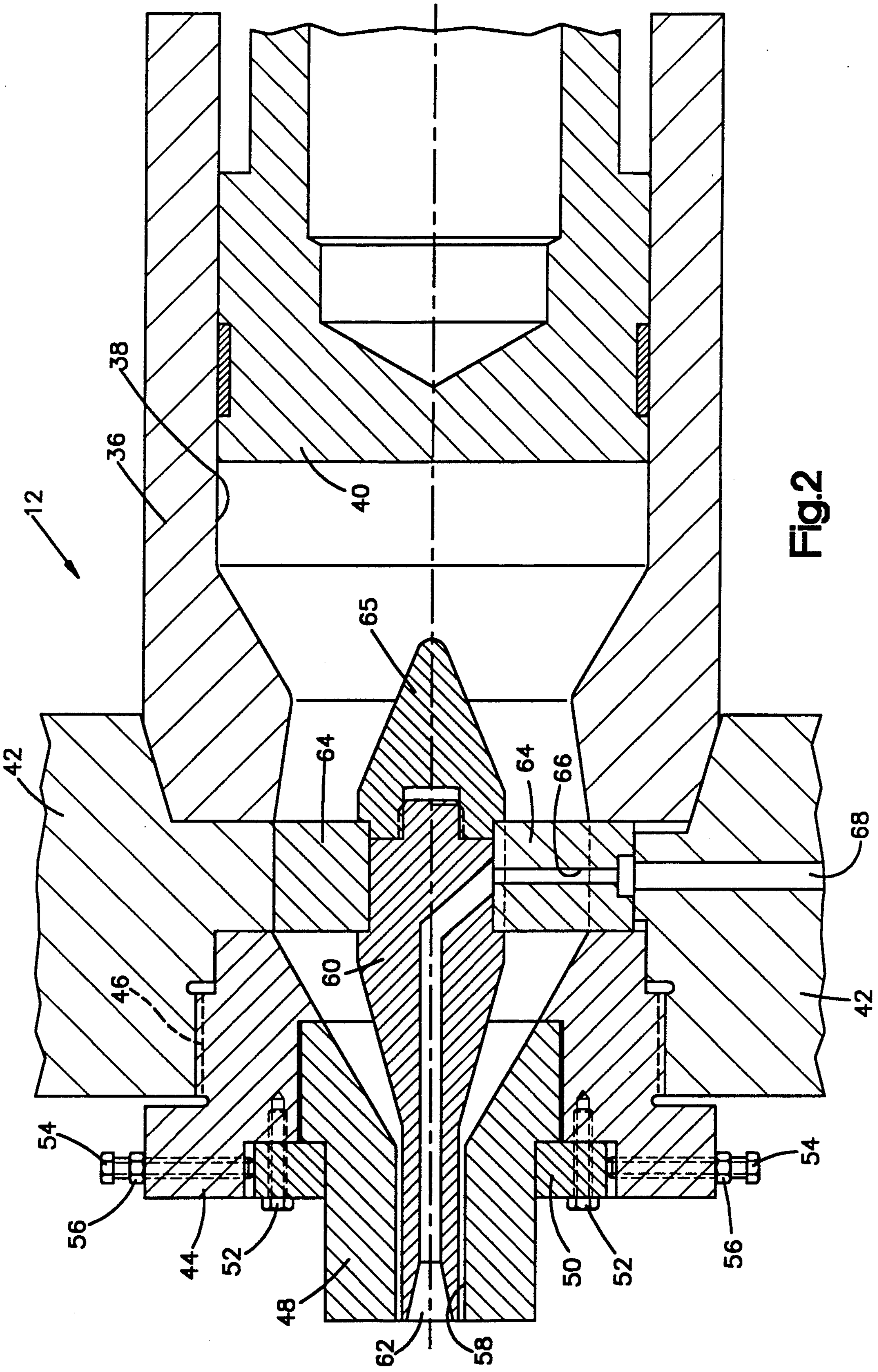
FIG. 2 is a cross-sectional view of an extruder used as part of the invention, including a die and a mandrel that are used to form tubes.
Figure 3:
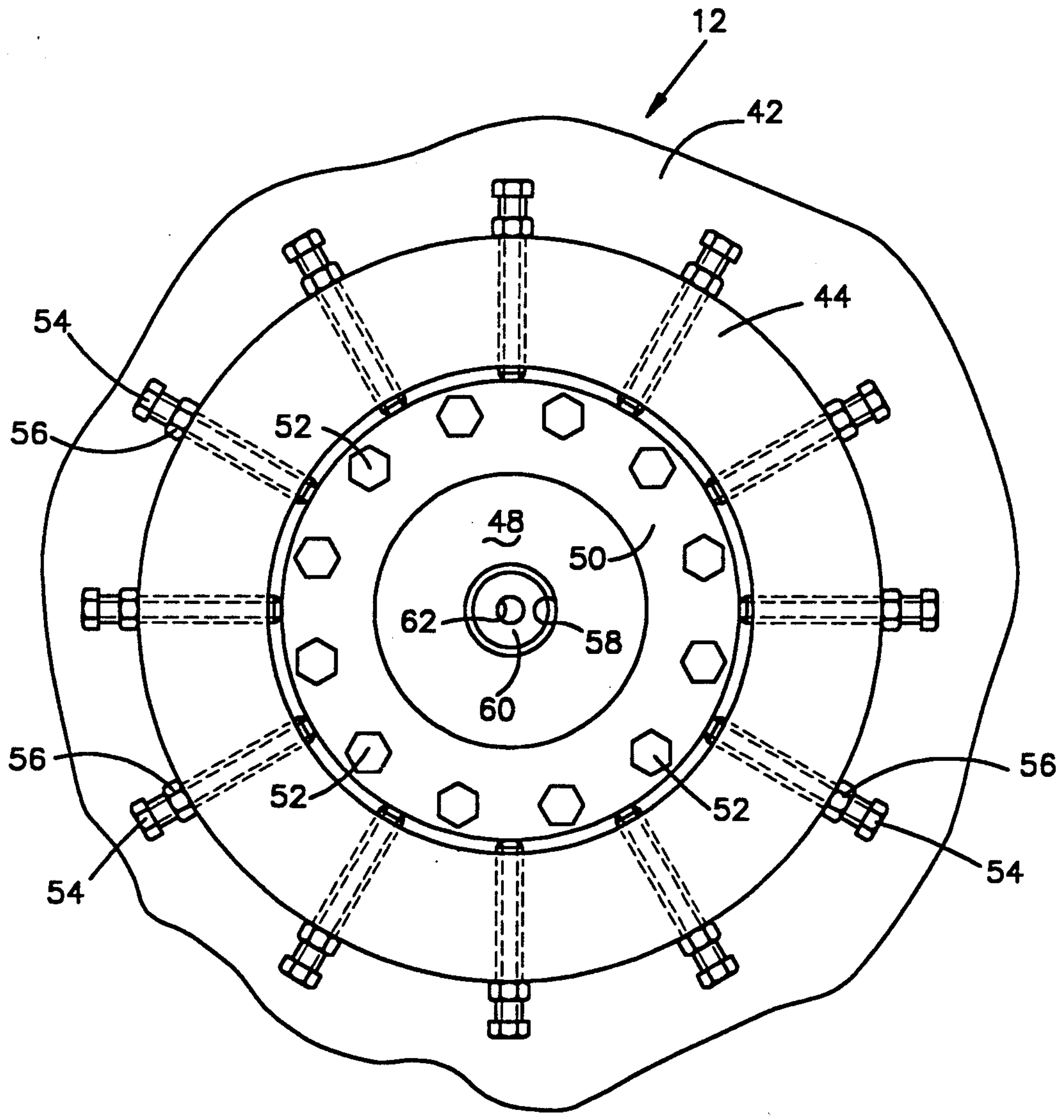
FIG. 3 is an end view of the extruder of FIG. 2, taken from the left as viewed in FIG. 2.

Referring to FIGS. 2 and 3, the extruder 12 includes a container 36 having a longitudinally extending bore 38. A ram 40 is disposed in the upstream portion of the bore 38. The ram 40 is connected to a DC drive motor and gearbox plus screwjack (not shown) which drives the ram 40 at a very slow and accurate adjustable speed, with tachometer feedback.

The container 36 is connected to a casing 42. An adapter 44 is secured to the forward-facing portion of the casing 42 by means of threads indicated at 46. A die 48 is secured to the forwardmost portion of the adapter 44 by means of a ring 50 and bolts 52. A plurality of radially extending bolts 54 extend through the adapter 44 and into engagement with the outer diameter of the ring 50. The bolts 54 are locked in placed relative to the adapter 44 by means of locknuts 56.

The die 48 includes a longitudinally extending bore 58 of a desired cross-section. As illustrated, the cross-section is circular, but it could be non-circular if desired, as noted earlier. An elongate mandrel 60 having a hollow interior 62 is disposed within the bore 58 and is secured in place there by means of radially extending supports 64. A rounded cone 65 is threaded to the mandrel 60 and securely attaches the mandrel 60 to the supports 64. One of the supports 64 includes a passage 66 which communicates with the interior 62 of the mandrel 60 and with a passage 68 formed in the casing 42. If a tube 10 having internal fins is desired, the inverse of the fins is incorporated into the mandrel geometry.

Figure 21:
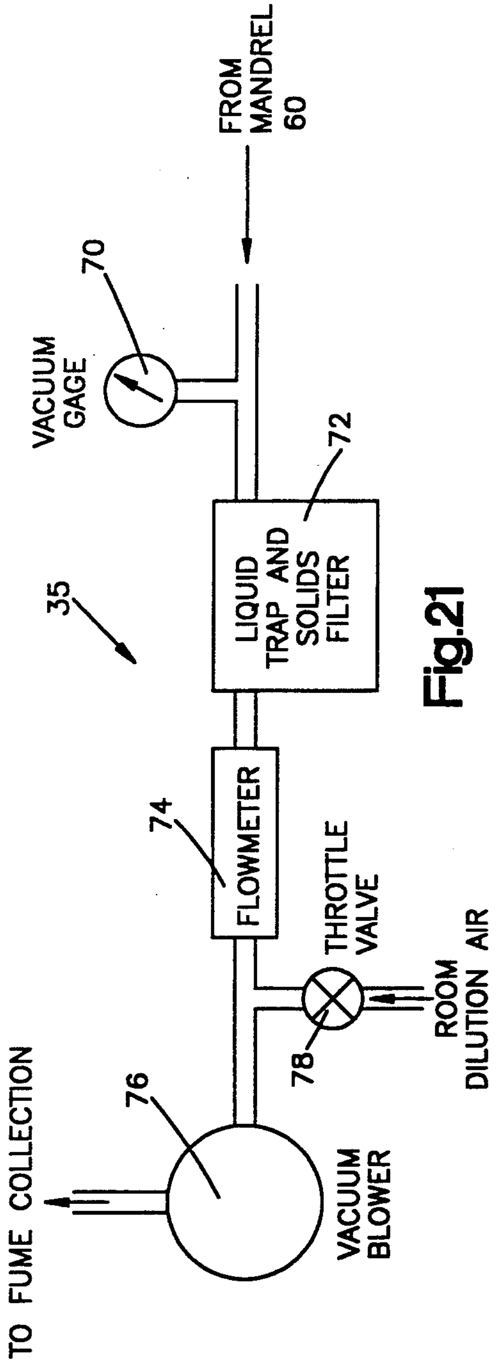
FIG. 21 is a schematic representation of a vacuum system used as part of the invention.

Referring to FIG. 21, the passage 68 is connected to the vacuum system 35. The vacuum system 35 includes a vacuum gauge 70, a liquid and solids trap 72, a flowmeter 74, and a vacuum blower 76. A throttle valve 78 enables ambient air to be used to dilute the air being drawn from the mandrel 60, so that the blower 76 will receive enough total volume of air for proper cooling of the blower 76.

As will be apparent from an examination of FIGS. 2 and 3, the spacing between the bore 58 and the mandrel 60 determines the wall thickness of the tube 10. The die 48 can be adjusted relative to the mandrel 60 in order to achieve excellent concentricity and, hence, uniform wall thickness in the extruded tube 10. The adjustment is made by appropriately tightening or loosening the bolts 54 which bear upon the ring 50. Through trial and error adjustment of the bolts 54, the die 48 eventually will be centered relative to the mandrel 60. The locknuts 56 then can be tightened to be sure that the adjustment will remain.

The Tube Guide 14

Figures 4A, 4B:
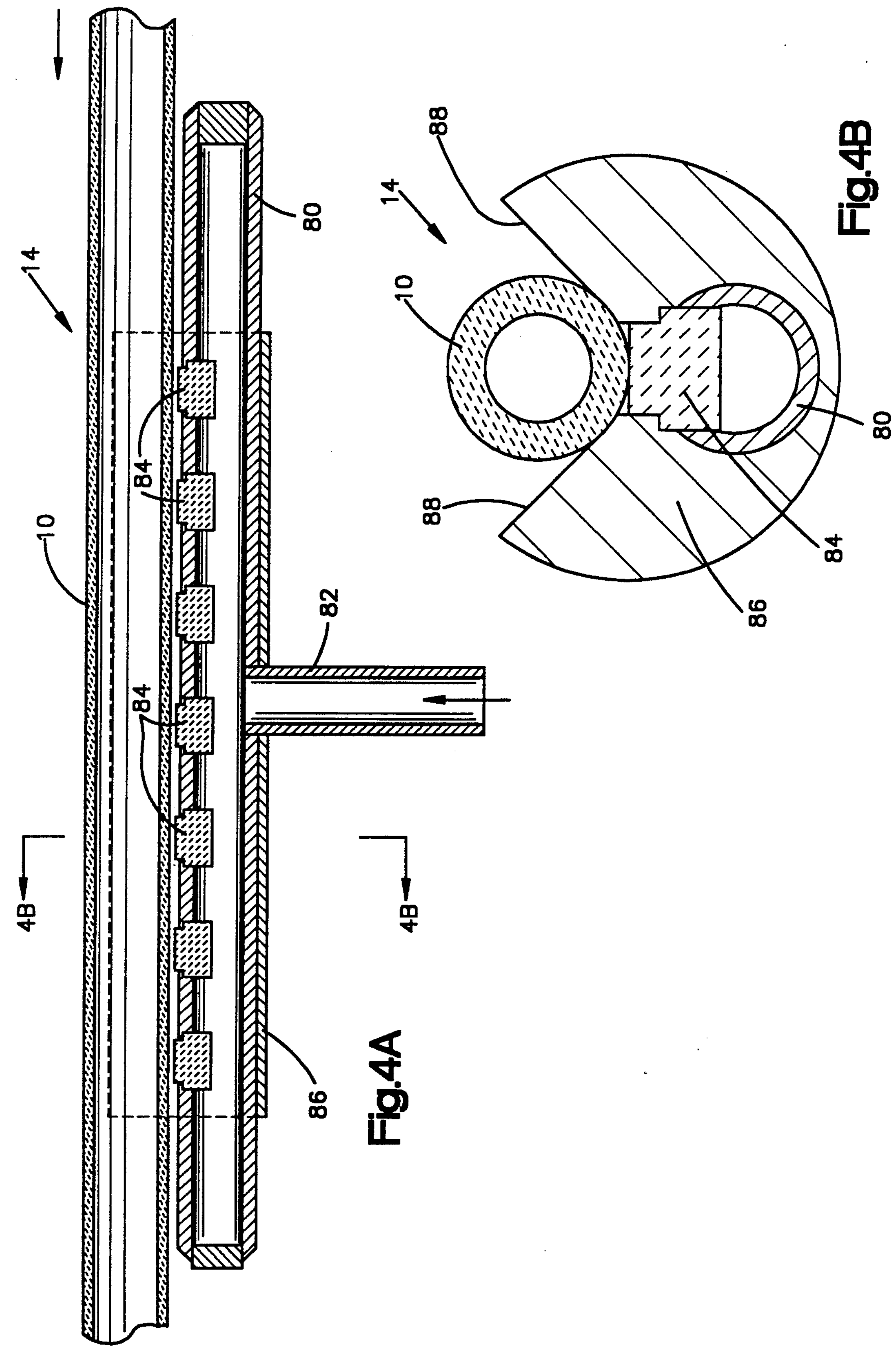
FIG. 4A is a cross-sectional view of a tube guide used as part of the invention.
FIG. 4B is a cross-sectional view of the tube guide of FIG. 4A, taken along a plane indicated by line 4B—4B in FIG. 4A.

Referring to FIGS. 4A and 4B, the tube guide 14 includes a longitudinally extending tube 80 disposed immediately downstream of the die 48. A conduit 82 is connected to the tube 80 for supplying air under pressure from a source (not shown) into the tube 80. A plurality of porous plugs 84 extend through openings formed in the upper surface of the tube 80. The plugs 84 enable air under pressure to be diffused therethrough so as to form a cushion upon which the tube 10 can be supported. The tube 80 is surrounded by a longitudinally extending trough 86 having diverging, straight-sided sidewalls 88. The sidewalls 88 diverge at an angle of approximately 90 degrees.

The tube guide 14 supports the newly extruded tube 10 and prevents it from sagging. The air diffused through the plugs 84 provides a cushion of air upon which the newly extruded tube 10 can be supported. In addition to preventing the tube 10 from sagging, the use of a cushion of air to support the tube 10 prevents surface deformation, including scratches, from occurring at a time when the tube 10 is wet and easily damaged.

The Dryer 16

Figure 5:
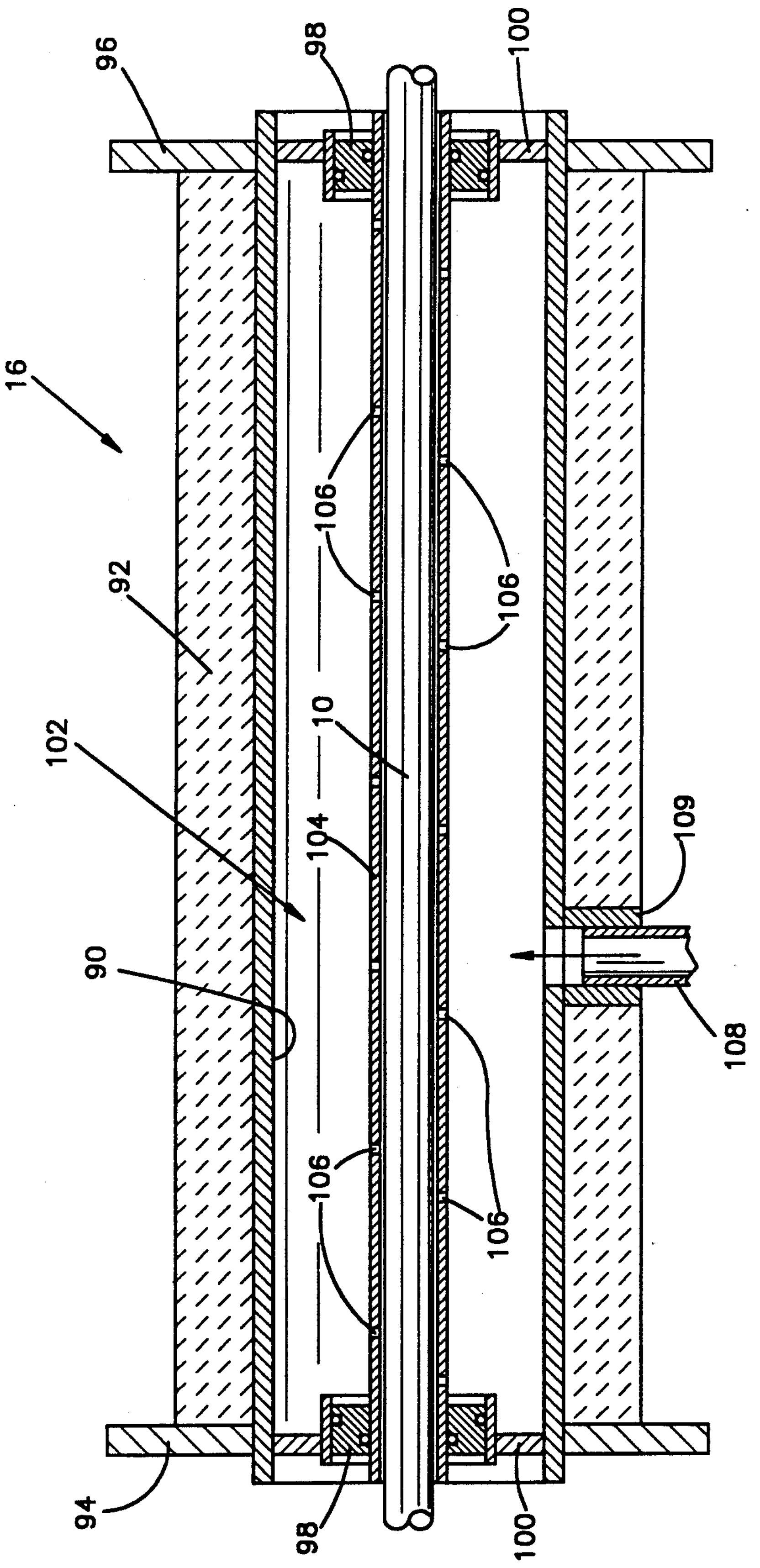
FIG. 5 is a cross-sectional view of a dryer used as part of the invention.

Referring to FIG. 5, the dryer 16 includes a hollow, cylindrical shell 90. Insulation 92 is disposed about the shell 90. A pair of end plates 94, 96 support the shell 90. The plate 94 is rigidly secured to the shell 90, while the plate 96 is loosely connected to the shell 90 in order to accommodate expansion.

A pair of O-ring-fitted brass plugs 98 are disposed at each end of the shell 90. The plugs 98 are supported concentrically relative to the shell 90 by means of supports 100. The plugs 98 and the supports 100 enclose the ends of the shell 90, thereby creating a chamber 102.

A porous graphite tube 104 is disposed within the chamber 102 and is supported by means of the plugs 98. The tube 104 includes a plurality of radially extending openings 106 that are spaced along the length of the tube 104. A conduit 108 extends through the shell 90 and is connected thereto by means of a fitting 109. The conduit 108 enables hot air from a source (not shown) to be directed into the chamber 102.

The clearance between the outer diameter of the newly extruded tube 10 and the inner diameter of the tube 104 is rather small. For example, if the newly extruded tube 10 has a nominal outside diameter of 0.615 inch, the tube 104 typically will have a nominal inside diameter of 0.75 inch. In order to insure proper airflow, the openings 106 have a diameter of about 0.040 inch, and are spaced 4 holes about every twelve inches along the length of the tube 104 in a 360° pattern. The conduit 108 enters the chamber 102 at an axial location about 62% of the length of the chamber 102. Accordingly, hot air directed into the chamber 102 will tend to warm the exit end of the chamber 102 more than the entrance end.

As will be apparent from an examination of FIG. 5, heated air directed into the chamber 102 will pass through the openings 106 and closely surround the tube 10. Heated air will be discharged from the dryer 16 at each end of the tube 104. The heated air that enters the tube 104 tends to support the tube 10 on a cushion of air, in a manner similar to the tube guide 14.

The First Pinch Rolls 18

Referring to FIGS. 6–8, the first pinch rolls 18 include an upper roll 110 and a lower roll 112. The rolls 110, 112 each have a soft rubber coating 114 on their outer surface. The coating 114 has a 70 durometer hardness rating. The roll 110 includes a circumferential groove 113 that is adapted to conform generally to the outer diameter of the tube 10. The lower roll 112 includes a circumferential groove 115 that also is adapted to conform to the outer diameter of the tube 10.

A shaft 116 supports the roll 110 for rotation. An air cylinder 118 is connected to the shaft 116 by means of a rod 120. The lower roll 112 is supported for rotation by means of a drive shaft 122 projecting from a DC gearmotor 124. The gearmotor 124 is equipped with a tachometer speed control and can maintain very precise adjustable speeds. If desired, the tachometer speed control could be connected to the extruder 12 to automatically correlate the speed of extrusion with the pinch roll speed.

As will be apparent from an examination of FIGS. 6–8, the lower roll 112 is fixed relative to the horizontal. The air cylinder 118 can be activated to space the roll 110 a large distance from the roll 112 for purposes of threading the tube 10 initially. Thereafter, the cylinder 118 is activated to close the roll 110 against the tube 10 and to compress the tube 10 against the lower roll 112. The air cylinder 118 includes an adjustable air supply to permit the pressure on the tube 10 to be maintained at a desired low pressure. The lower roll 112 is driven by the gearmotor 124 at a desired low speed to apply a slight tension to the tube 10.

The Calciner 20

Figure 9:
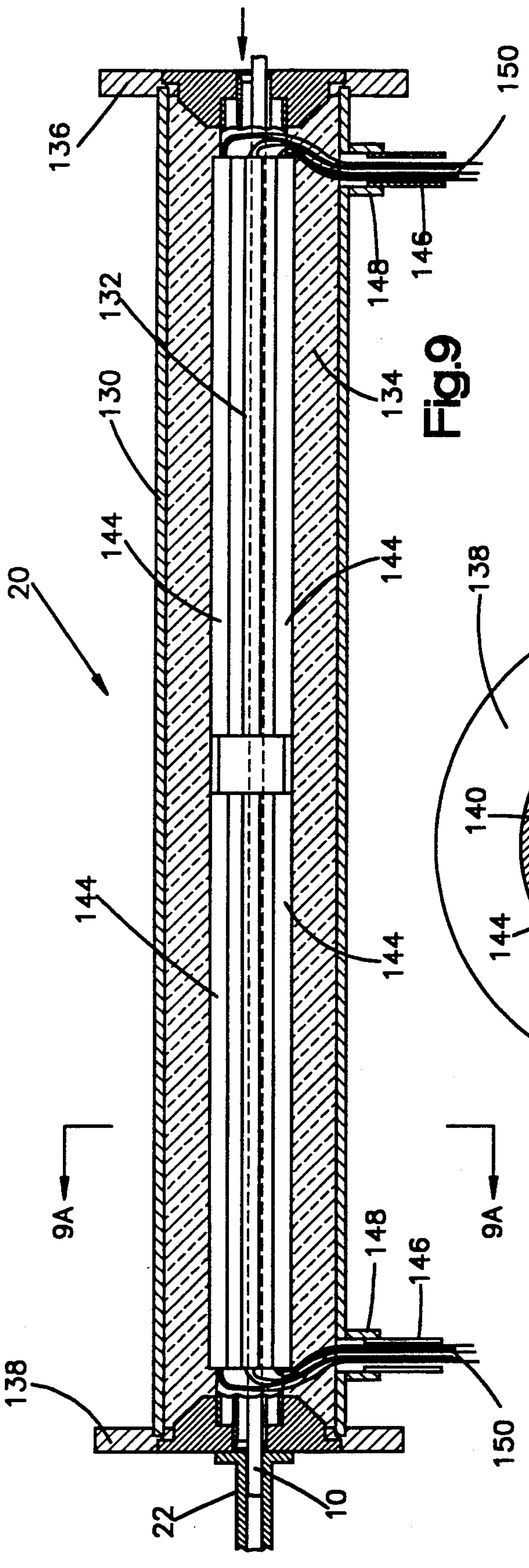
FIG. 9 is a cross-sectional view of a calciner used as part of the invention.
Figure 9A:
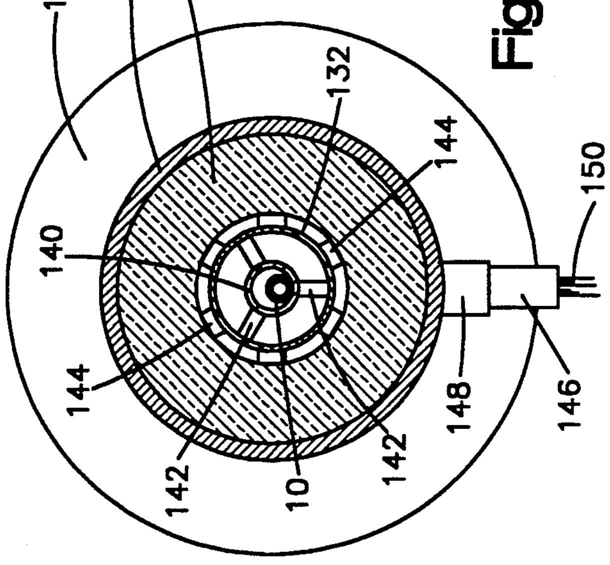
FIG. 9A is a cross-sectional view of the calciner of FIG. 9, taken along a plane indicated by line 9A—9A in FIG. 9.

Referring to FIGS. 9 and 9A, the calciner 20 includes a cylindrical shell 130, a liner 132 concentrically disposed within the shell 130, and insulation 134 disposed intermediate the shell 130 and the liner 132. A pair of end plates 136, 138 close the ends of the calciner 20.

An elongate, cylindrical, stainless steel tube 140 is concentrically disposed within the liner 132. The tube 140 is maintained in place within the liner 132 by means of radially extending supports 142. A plurality of electrical heating elements 144 are disposed about the liner 132. Spaced conduits 146 open through the shell 130 along its bottom, and are connected to the shell 130 by means of fittings 148 Lead lines 150 extend through the conduit 146 and into the interior of the shell 130 in order to provide electrical current to the heaters 144.

As illustrated, two separate sets of heating elements 144 are provided. The temperature of the calciner 20 is variable and is controlled by a temperature controller and thermocouple (not shown). A fume hood (not shown) is positioned adjacent the end plate 136 at that point where the tube 10 enters the calciner 20. The fume hood withdraws gases from the interior of the calciner 20 for disposition elsewhere.

As will be described subsequently, an inert atmosphere is maintained within the calciner 20. It is important that gases flow through the calciner 20 from the exit end toward the entrance end so that no oxygen-bearing gases can enter the sintering furnace 24.

The Transition Tube 22

The transition tube 22 is shown in FIG. 9 as being connected to the end plate 138. The transition tube 22 is approximately 24 inches long, and has an inner diameter slightly larger than the outer diameter of the tube 10. If, for example, the tube 10 has an outer diameter of 0.625 inch, then the inner diameter of the transition tube 22 should be on the order of 0.6875 inch.

The transition tube 22 is not heated. Accordingly, the tube 10 becomes cooled during its passage through the transition tube 22. The transition tube 22 isolates the oxygen-bearing gases released during calcining from the much hotter sintering furnace 24.

The Sintering Furnace 24

Figure 10:
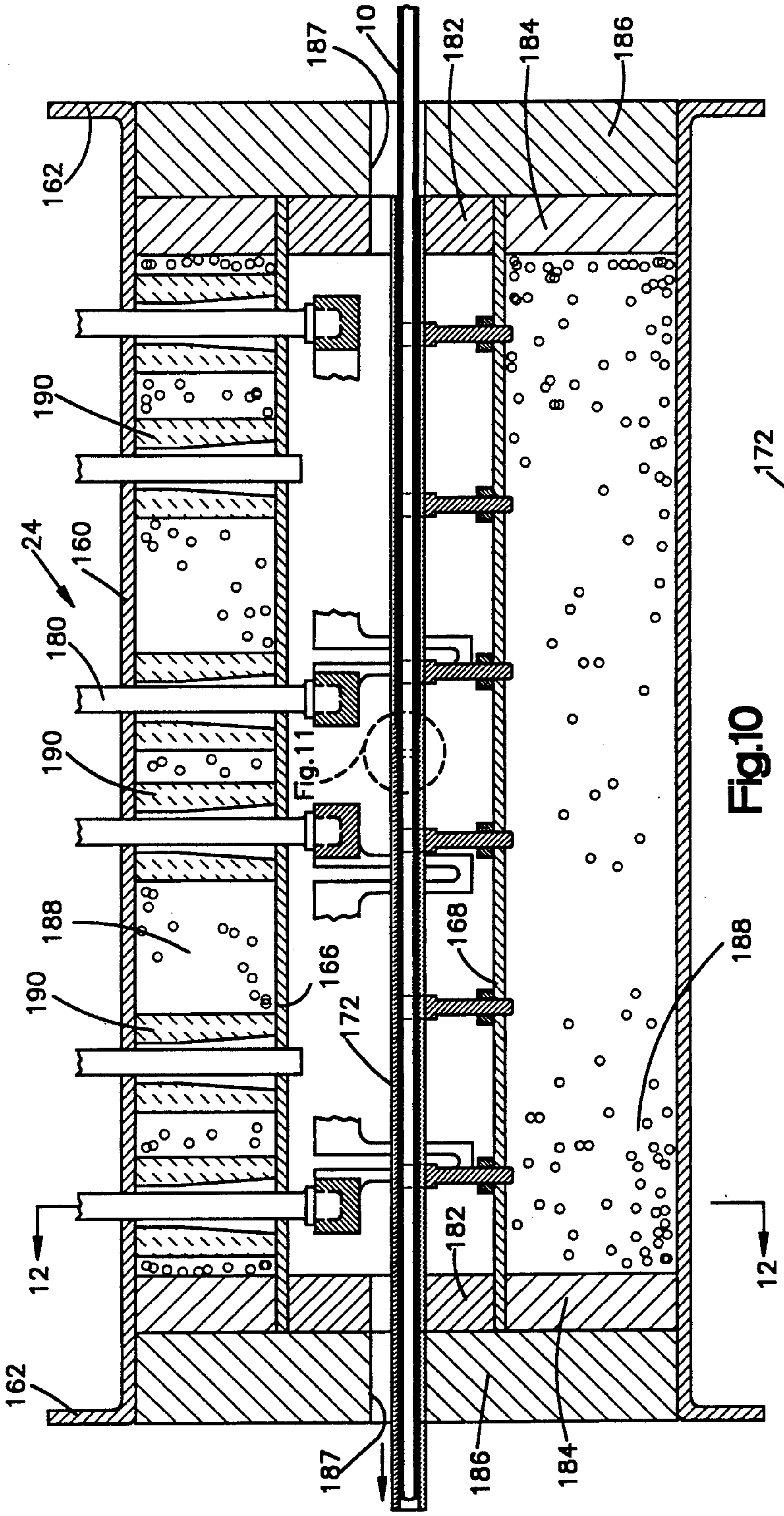
FIG. 10 is a cross-sectional view of a sintering furnace used as part of the invention.
Figure 11:
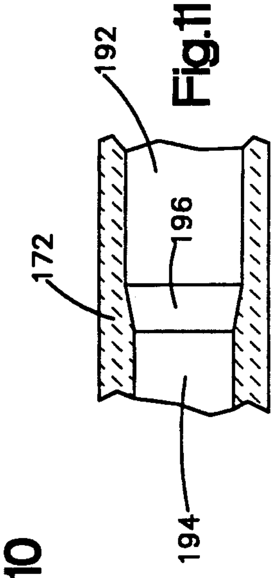
FIG. 11 is an enlarged view of a portion of the sintering furnace of FIG. 10, showing a portion of a tube guide used as part of the invention.
Figure 12:
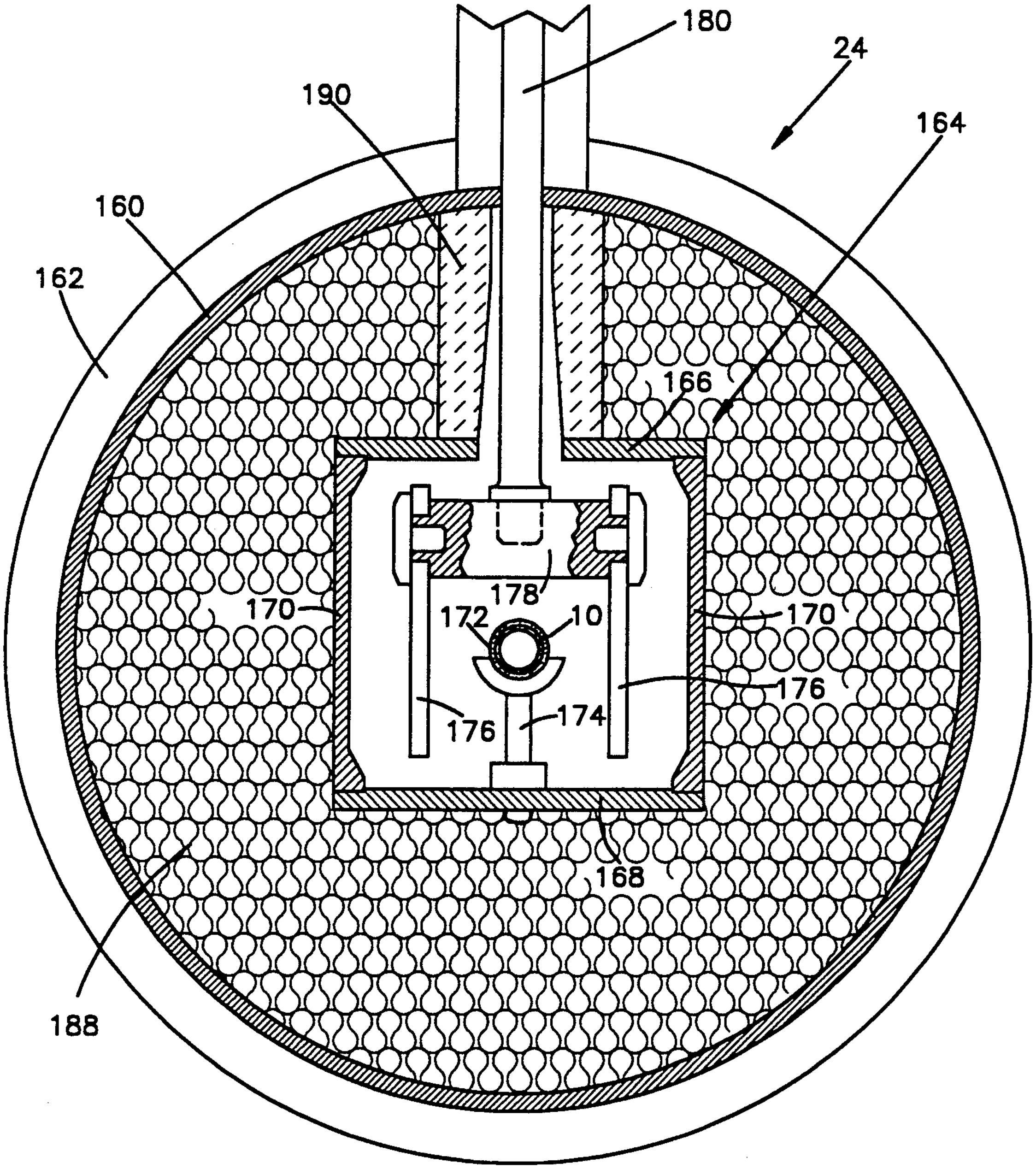
FIG. 12 is a cross-sectional view of the sintering furnace of FIG. 10, taken along a plane indicated by line 12—12 in FIG. 10.

Referring to FIGS. 10–12, the sintering furnace 24 includes a large, cylindrical shell 160 having radially extending flanges 162 at each end. A graphite box 164 having a rectangular cross-section (FIG. 12) is disposed centrally within the shell 160. The box 164 includes a top plate 166, a bottom plate 168, side plates 170, a tube guide 172, and tube guide supports 174.

The box 164 encloses a plurality of graphite resistor heating elements 176. The heating elements 176 are disposed on either side of the tube guide 172 along the length of the tube guide 172. The heating elements 176 are connected at their upper ends by means of graphite connectors 178, which in turn are connected to graphite power rods 180. The power rods 180 are connected to a source of electrical current (not shown) that energizes the heating elements 176. A pair of optical pyrometer sight ports 181 extend through openings formed in the shell 160 and the box 164 in order for the internal temperature of the box 164 to be monitored and for inert gas to be directed into the box 164.

A pair of insulated end caps 182 are provided for the box 164 so as to close the ends thereof. The end caps 182 are supported within the shell 160 by an insulated support member 184. The ends of the shell 160 are closed by insulation barriers 186 that engage the ends of the end caps 182 and the support members 184. The end caps 182 and the insulation barriers 186 include small, longitudinally extending openings 187 that permit the tube 10 to enter and leave the sintering furnace 24. The insulated end caps 182, the support members 184, and the barriers 186 are made of graphite foam or similar material.

The interior of the shell 160 is filled with high purity acetylene black having a density of about 9 $lb/ft^3$. The acetylene black is indicated by the reference numeral 188. Insulation barriers 190 are provided for the power rods 180 and the sight ports 181 where they extend from the upper plate 166 through to openings formed in the upper surface of the shell 160.

Referring particularly to FIG. 11, the tube guide 172 is an elongate, "fine grain" graphite member having a large diameter section 192, a small diameter section 194, and a tapered transition area 196. The transition area 196 is in the form of a beveled shoulder that is located at approximately the center of the sintering furnace 24. The centerline of the tube guide 172 is aligned with the centerline of the tube 10 being moved through the sintering furnace 24.

The tube 10 shrinks upon being sintered. The linear shrinkage is approximately 18% for the preferred alpha silicon carbide ceramic powder described previously. By aligning the longitudinal axis of the tube guide 172 with that of the tube 10, and by constricting the inner diameter of the tube guide 172 as described previously, the tube 10 will be adequately supported at all times during its passage through the sintering furnace 24. A controlled small clearance of about 0.060 inch on the diameter is maintained between the tube guide 172 and the tube 10. Because the tube 10 is well supported and because its longitudinal centerline is kept straight during sintering, the straightness of the finished tube 10 is greatly enhanced.

The Cooler 26

Figure 13:
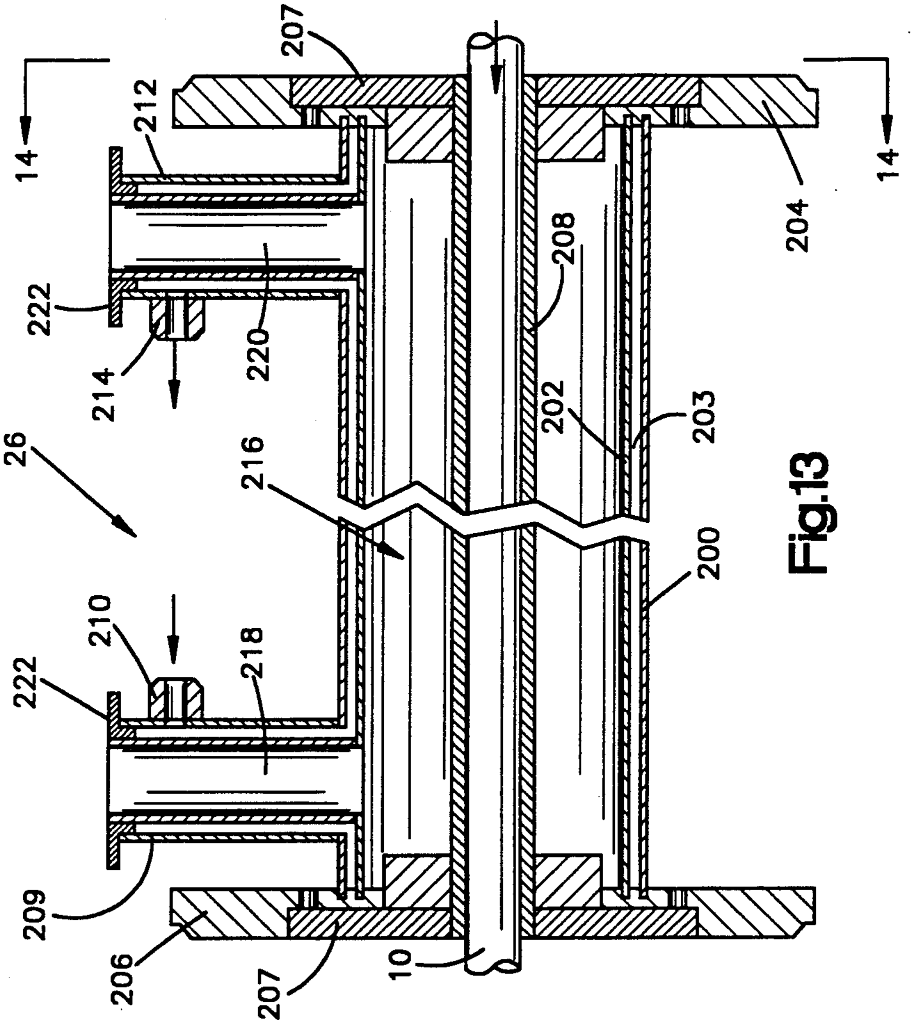
FIG. 13 is a cross-sectional view of a cooler used as part of the invention.
Figure 14:
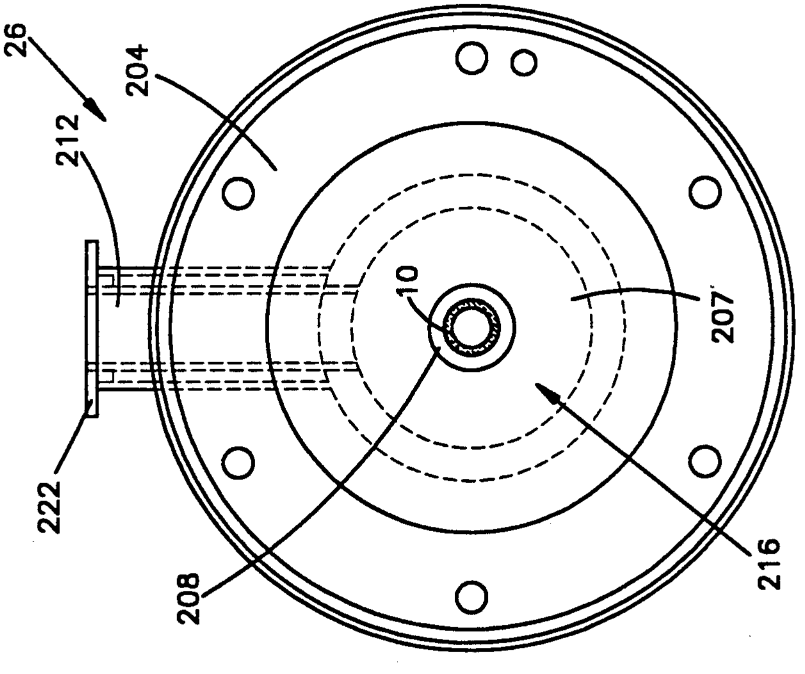
FIG. 14 is an end elevational view of the cooler of FIG. 13.

Referring to FIGS. 13 and 14, the cooler 26 includes a cylindrical shell 200 within which a second, smaller, cylindrical shell 202 is concentrically disposed. A small chamber 203 is formed between the shells 200, 202. End plates 204, 206 close the shells 200, 202 and define the ends of the chamber 203. End caps 207 are carried by the plates 204, 206 and support a longitudinally extending graphite tube guide 208 concentrically within the shell 202. The end caps 207 are made of a strong insulating material such as graphite foam.

A conduit 209 is connected to the shell 200 and includes a fitting 210 that is adapted to be connected to a source of cooling fluid such as water. A second conduit 212 is connected to the shell 200 and also includes a fitting 214 for connection to a fluid discharge (not shown). The inner diameter of the second shell 202 is relatively large, creating an elongate, large-diameter chamber 216 through which the tube guide 208 extends.

A vertically extending sleeve 218 is concentrically disposed within the conduit 209. Similarly, a vertically extending sleeve 220 is concentrically disposed within the conduit 212. The sleeves 218, 220 open into the chamber 216. The gap between the upper ends of the conduits 209, 212 and the sleeves 218, 220 is closed by flanged rings 222. The flanged rings 222 seal off the openings defined by the sleeves 218, 220.

As will be apparent from an examination of FIG. 13, cooling fluid that is directed into the conduit 209 fills the chamber 203 and is discharged through the conduit 212. The shell 202 will be chilled and, in turn, the heated tube 10 passing through the tube guide 208 will be cooled, primarily by radiation.

The Exit Tube Guide 28

The exit tube guide 28 is located downstream of the end plate 206. The exit tube guide 28 can be substantially similar to the adjustment mechanism for the die 48 included as part of the extruder 12. The exit tube guide 28 is closely fitted to the tube 10 (about 0.063 inch clearance). The exit tube guide 28 can be adjusted radially relative to the centerline of the tube 10 in order to produce small deflective forces on the tube 10. The exit tube guide 28 is adjusted in a trial and error manner to produce tubes 10 having maximum straightness. The use of the exit tube guide 28 in conjunction with the tube guide 172 included as part of the sintering furnace 24 produces excellent straightness characteristics in the finished tube 10.

A horizontally extending sleeve 224 (FIG. 15) projects downstream from the exit tube guide 28. The end of the sleeve 224 is closed by a rubber boot seal 226 that has a small opening at its center through which the tube 10 passes in closely fitting relationship. Inert gas such as argon or nitrogen is introduced into the exit tube guide 28 under pressure and flows upstream through the cooler 26. The gas is discharged from the calciner 20 into the fume hood located adjacent the end plate 136. The inert gas thus surrounds the tube 10 while it is being treated at elevated temperatures.

The Second Pinch Rolls 30

Figure 15:
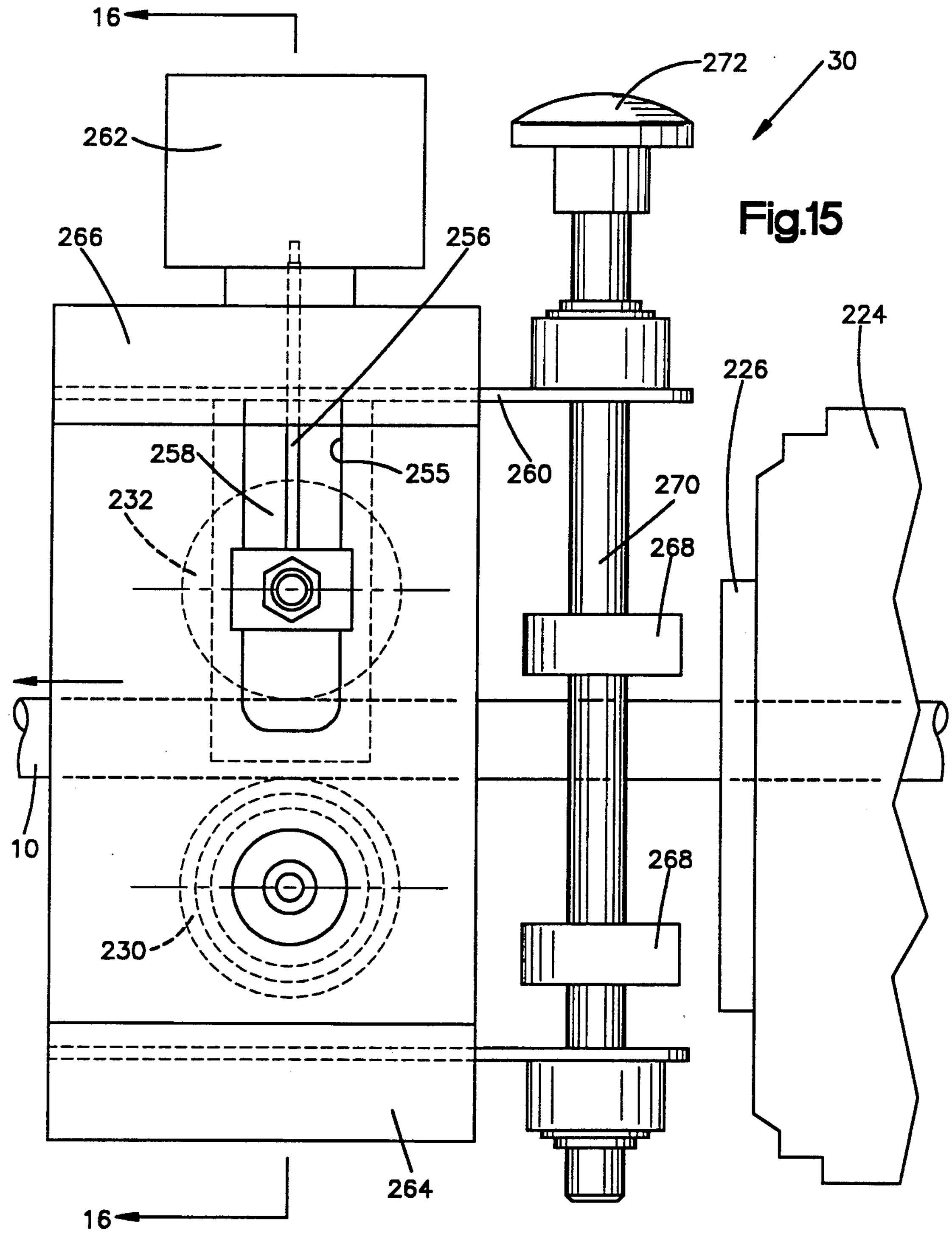
FIG. 15 is a top plan view, with certain parts shown in phantom, of second pinch rolls used as part of the invention.
Figure 16:
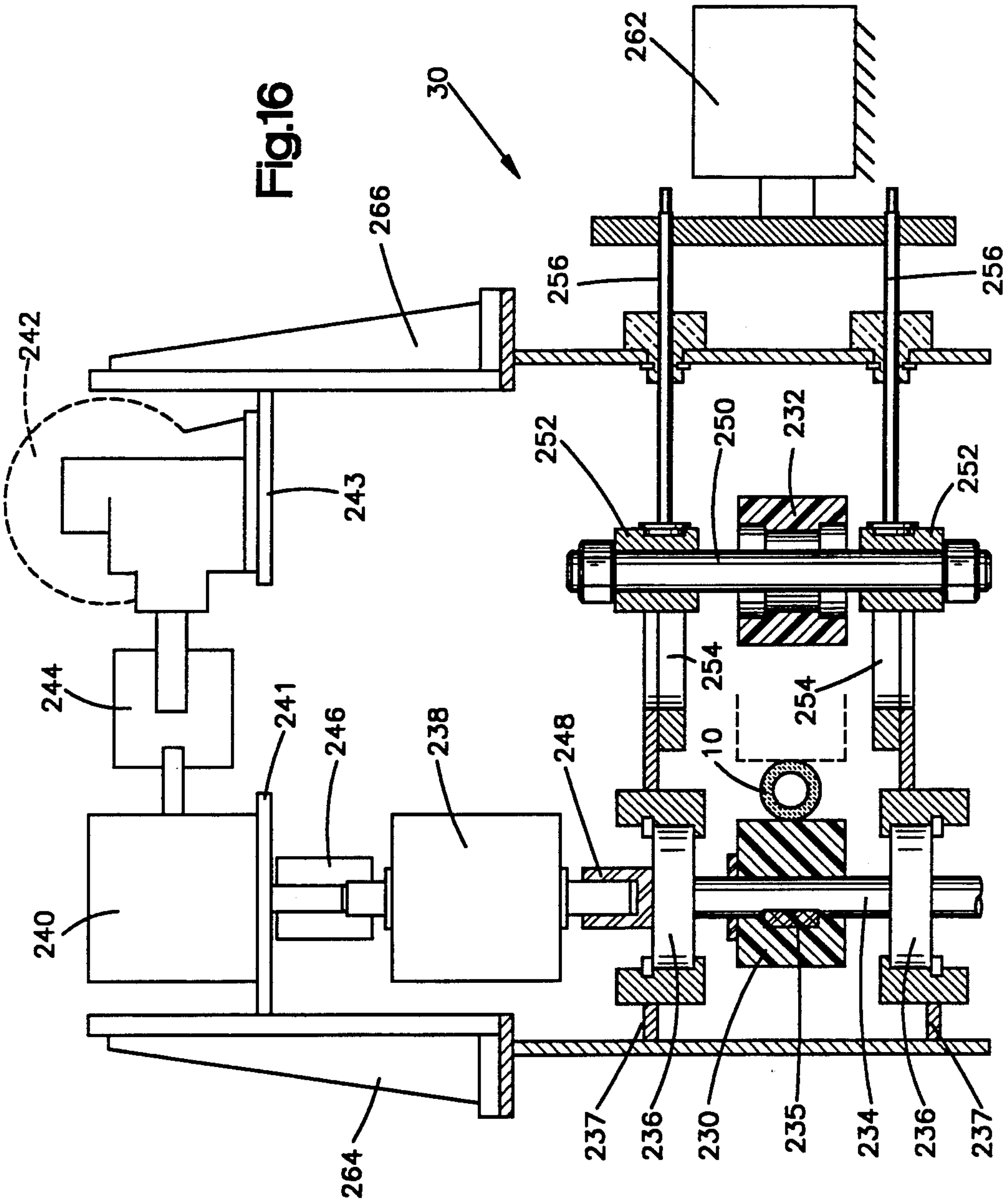
FIG. 16 is a cross-sectional view of the second pinch rolls taken along a plane indicated by line 16—16 in FIG. 15.

Referring to FIGS. 15 and 16, the second pinch rolls 30 include a first roll 230 and a second roll 232. The first roll 230 is supported for rotation about a vertical axis by means of a drive shaft 234. The roll 230 is prevented from rotating relative to the drive shaft 234 by means of a key 235. The shaft 234 is supported for rotation by bearings 236, which in turn are supported by brackets 237. The shaft 234 is driven by a magnetic particle clutch 238. The clutch 238 is driven by a gear reducer 240, which in turn is driven by a D.C. gearmotor 242. The gear reducer 240 is supported by a bracket 241, while the gearmotor 242 is supported by a bracket 243.

The gearmotor 242 and the gear reducer 240 are connected by a coupling 244. The gear reducer 240 and the clutch 238 are connected by a coupling 246. The clutch 238 is connected to the drive shaft 234 by means of a splined connection indicated at 248.

The roll 232 is supported for rotation by bearings (not shown) which in turn are supported by a shaft 250. The shaft 250 is supported by upper and lower bearings 252, which in turn are supported by support brackets 254 having a laterally extending slot 255. The bearings 252 are engaged by upper and lower actuating rods 256. The other ends of the rods 256 are connected by a header plate 260, which in turn is connected to an air cylinder 262.

A frame 264 supports the brackets 237, 241. An opposing frame 266 supports the bracket 243 and the rods 256. Referring to FIG. 15, pinch roll support brackets 268 provide support for a laterally extending adjustment rod 270. The rod 270 is secured at one end to the frame 264 and extends through the header plate 260 at its other end. An adjustment knob 272 is provided for the rod 270.

As will be apparent from an examination of FIGS. 15 and 16, the first roll 230 is driven, while the second roll 232 is not. The first roll 230 is stationary relative to the frames 264, 266, while the second roll 232 can move laterally relative thereto (and relative to the tube 10). The adjustment rod 270 moves the driven roll 230 and thus the whole framework laterally relative to the centerline of the sintered tube 10, thus allowing the driven roll 230 to be positioned as desired for various tube diameters.

The rotation of the rolls 230, 232 is carefully controlled relative to the first pinch rolls 18 by means of a voltage adjustment of the clutch 238. The rolls 230, 232 are operated such that a constant tension of approximately 6–7 pounds is applied to the tube 10 at any given line speed. This amount of constant tension has been found to be a considerable aid to tube straightness, as well as a means by which friction through the line can be overcome.

The Cut-Off Mechanism 32

Figure 17:
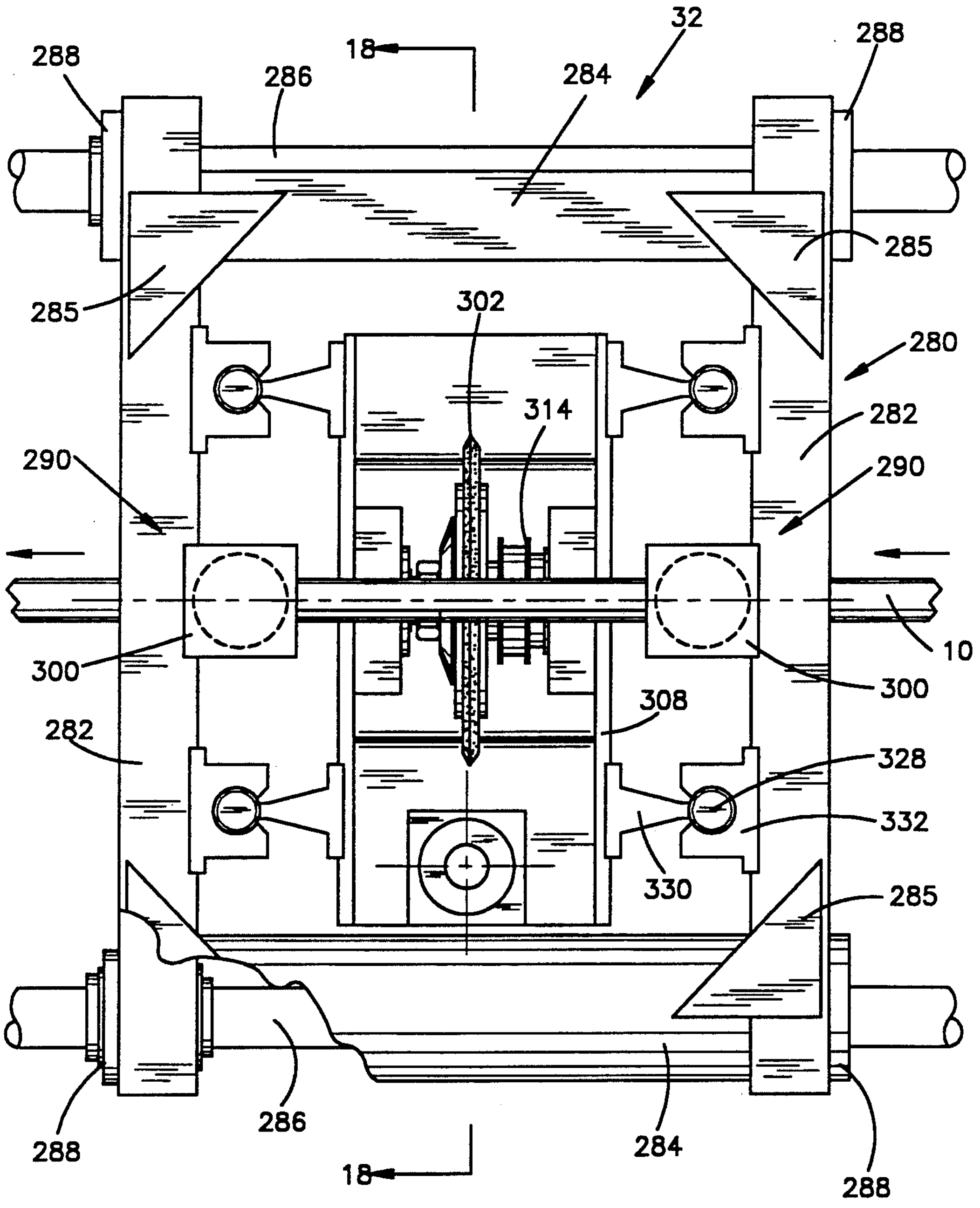
FIG. 17 is a top plan view of a tube cut-off mechanism used as part of the invention.
Figure 18:
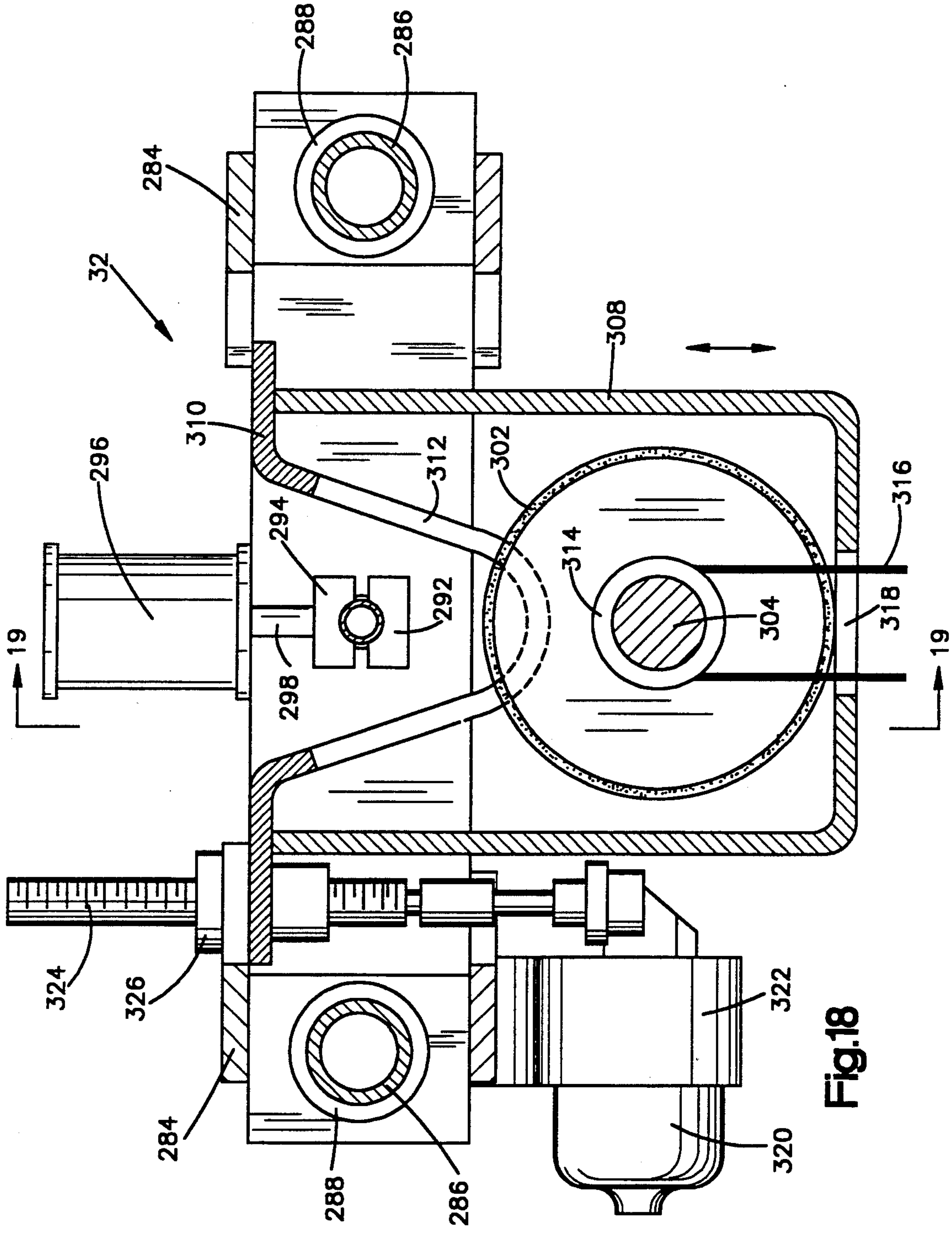
FIG. 18 is a cross-sectional view of the cut-off mechanism of FIG. 17 taken along a plane indicated by line 18—18 in FIG. 17.
Figure 19:
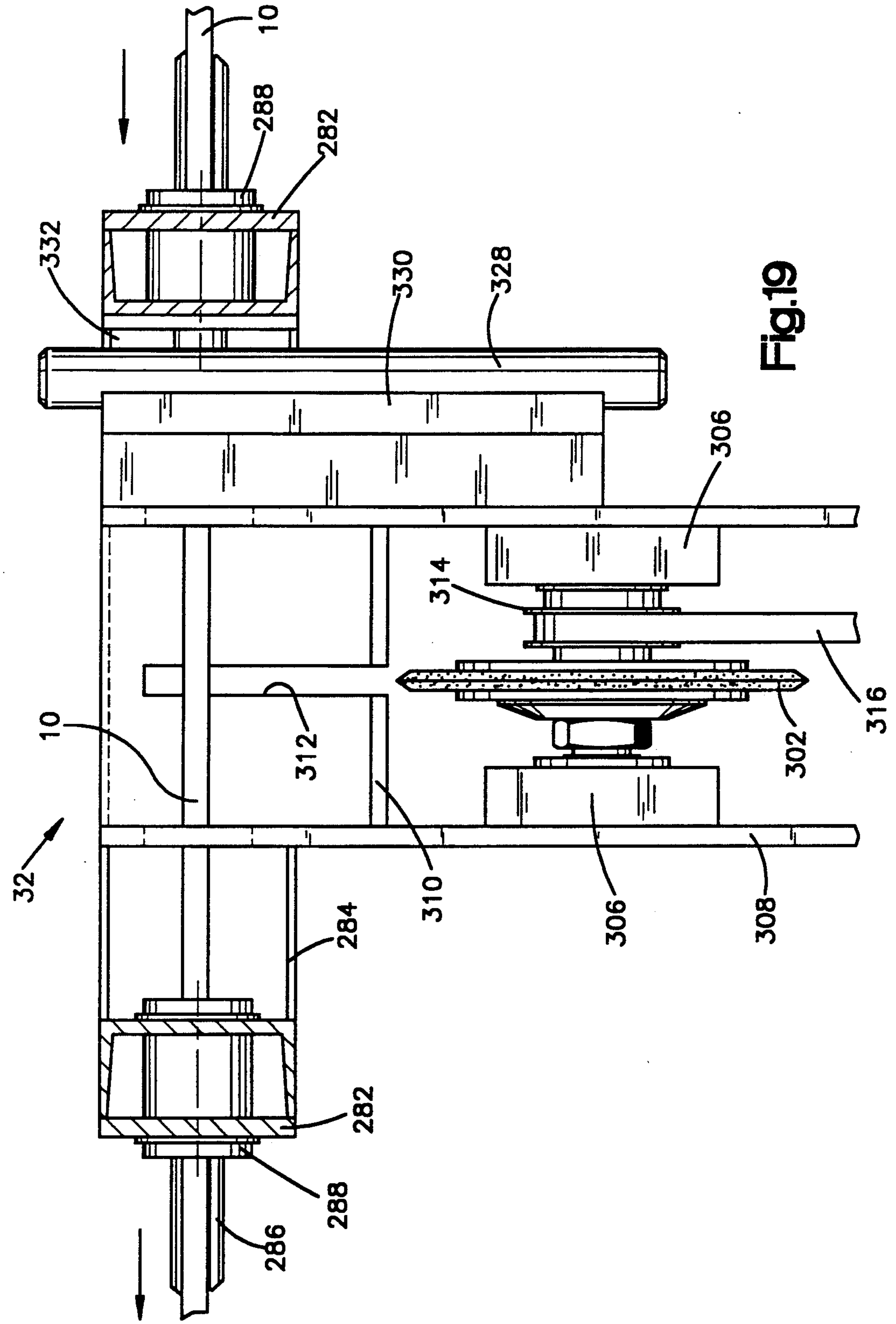
FIG. 19 is a cross-sectional view of a portion of the cut-off mechanism of FIG. 17 taken along a plane indicated by line 19—19 in FIG. 18.

Referring to FIGS. 17, 18 and 19, the cut-off mechanism 32 includes a rectangular frame, or carriage 280. The carriage 280 includes a pair of spaced, box-like, laterally extending frame members 282 that are connected by a pair of spaced, axially extending frame members 284. The frame members 282, 284 are welded together with the aid of gussets 285 to form a rigid structure. The carriage 280 is mounted for movement along tubular rails 286. The rails 286 are aligned with the direction of travel of the tube 10. The carriage 280 is mounted to the rails 286 by means of low-friction ball bearings 288 that are included as part of the frame members 282. A weak spring (not shown) biases the carriage 280 to the right as viewed in FIG. 17.

A pair of clamps 290 are provided to grip the tube 10 during its passage through the cut-off mechanism 32. Referring particularly to FIG. 18, each clamp 290 includes a lower tube support 292, an upper tube support 294, an air cylinder 296, and a rod 298 projecting from the cylinder 296 to which the upper tube support 294 is attached. The cylinders 296 are connected to the frame members 282 by means of brackets 300.

A diamond cut-off wheel 302 is disposed beneath the tube 10. The wheel 302 is supported for rotation about an axis parallel to the longitudinal axis of the tube 10 by means of a shaft 304. The shaft 304 is supported for rotation by bearings 306 that are mounted to a housing 308. The housing 308 includes a guard 310 that has a slot 312 through which the wheel 302 extends. The shaft 304 is provided with a drive pulley 314 about which a drive belt 316 is reeved. A drive motor (not shown) is connected to the outside of the housing 308. The drive belt 316 passes through a slot 318 formed in the lower portion of the housing 308 for connection to the drive motor.

A variable speed DC gearmotor 320 is provided to drive the housing 308 (and with it the motor and the wheel 302) up and down. The motor 320 is supported by a mounting bracket 322. A ball screw 324 is connected to the motor 320. The ball screw 324 passes through a bracket 326 that is connected to the housing 308. A plurality of vertically extending guide tubes 328 (FIGS. 17 and 19) are connected to the housing 308 by means of brackets 330. The tubes 328 mate with guide brackets 332 that are securely attached to the frame members 282.

As will be apparent from the foregoing description, whenever it is desired to cut the tube 10, the clamps 290 are actuated so that the tube 10 is gripped. Due to the extremely low friction in the bearings 288 and due to the weakness of the retaining spring, the carriage 280 will begin to move to the left as viewed in FIG. 17. The force required to drive the carriage 280 is approximately 1.0–2.0 pounds. Although this force temporarily detracts from the force being applied to the tube 10 by the second pinch rolls 30, the temporary change in tension applied to the tube 10 has not been found to be detrimental.

As the carriage 280 is being moved due to the axial force supplied by the tube 10, the cut-off wheel motor is activated and the gearmotor 320 is energized so as to drive the housing 308 upwardly at a very slow variable rate (about 45 seconds for the complete upward excursion). The tube 10 is severed by the wheel 302 during the upward excursion of the housing 308. It takes about 15 seconds for the tube 10 to be severed. After the tube 10 has been severed, the motor 320 retracts the housing 308 quickly, and the clamps 290 are released to free the now-severed ends of the tube 10. The carriage 280 is returned to its rest position under the influence of the return spring.

The Inspection Table 34

Figure 20:
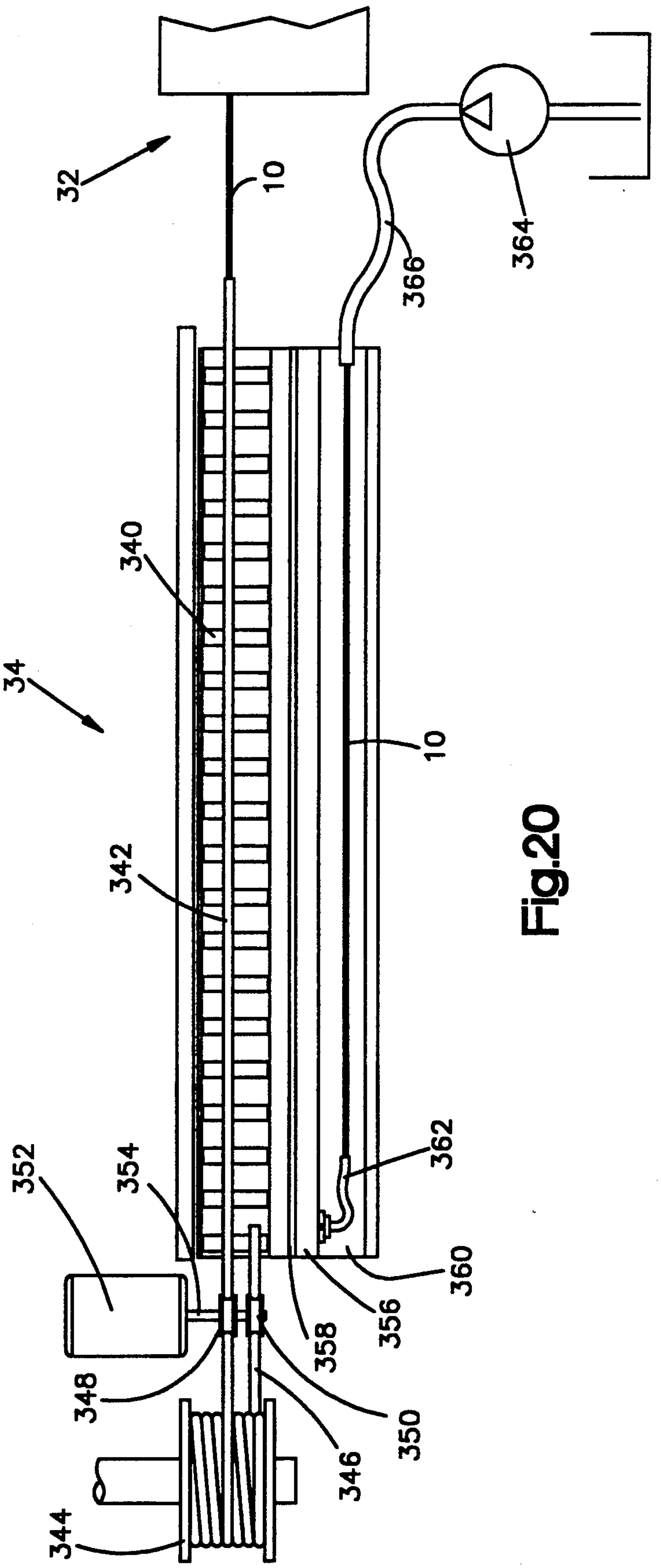
FIG. 20 is a schematic top plan view of an inspection table used as part of the invention.

Referring to FIG. 20, the inspection table 34 includes a plurality of horizontally disposed rollers 340. A first, elongate hose 342 is wrapped about a reel 344. As illustrated, the hose 342 extends across the rollers 340 and is connected to the end of the tube 10 by means of a clamp (not shown). A second hose 346 also is provided and is wrapped about a separate reel (not shown). The hoses 342, 346 enable inert gas such as argon or nitrogen to be supplied under pressure into the interior of the tube 10. The source for the gas is not shown.

The hoses 342, 346 are wrapped about idler pulleys 348, 350, respectively. A variable speed motor 352 includes a drive shaft 354 that is in contact with the hoses 342, 346 that are passed over the pulleys 348, 350. The hose reels are spring-loaded so that they always tend to retract the hoses 342, 346. The motor 352 and its drive shaft 354 control the rotation of the pulleys 348, 350 so as to match the retraction speed of the hoses 342, 346 with the speed of the tube 10 exiting the cut-off mechanism 32. Desirably, the hoses 342, 346 are retracted at a speed equal to the speed of the tube 10 without applying spring tension from the hose reels to the tube 10. The hoses 342, 346 thus apply little or no axial force to the tube 10.

The inspection table 34 can be as long as desired, limited only by space constraints or by the desire to manufacture tubes 10 having a certain fixed length. For example, the table 34 could extend to substantial lengths such as 60 feet or more. For most purposes, however, the table 34 can be approximately 20 feet in length.

As will be apparent from an examination of FIG. 20, the hose 342 will be retracted as the tube 10 being extruded passes through the cut-off mechanism 32. After the tube 10 has been severed, the second hose 346 can be extended and connected to the newly severed tube 10. It is expected that the flow of inert gas passing through the tube 10 will be stopped only a minute or two as the hose 346 is being connected. The connection should be made as quickly as possible in order to minimize the time when inert gas is not passing through the tube 10.

After the tube 10 has been fully extended across the table 34 and is being supported by the rollers 340, the hose 342 is disconnected. The tube 10 then is ready for testing. The table 34 includes a horizontally extending floor 356 from which a short, vertically extending wall 358 projects at right angles. The floor 356 and the wall 358 are carefully positioned relative to each other so that an accurate straight edge is provided. The tube 10 is placed on the floor 356 and is pressed against the wall 358. Any deviations from a straight line can be measured easily. The tube 10 generally will be considered acceptable for most commercial purposes if the deviation from a straight line is equivalent to one inch of lateral deflection for a 20-foot long tube.

After the straightness of the tube 10 has been determined, the tube 10 is ready for pressure testing. A trough 360 is disposed adjacent the floor 356. The trough 360 is generally U-shaped in cross-section. A hose 362 that is connected to a check valve is disposed at one end of the trough 360. A pump 364 is disposed adjacent the other end of the tube 10 and is connected to the tube 10 by means of a hose 366. After the tube 10 has been filled with water, it is pressurized by the pump 364 to a pressure whose value depends upon the desired tensile hoop stress to be applied to the tube, the tube outer diameter, and the tube wall thickness. For sintered alpha silicon carbide tubes 0.5 inch in diameter with a wall thickness of 0.060 inch, a pressure test of approximately 2600 p.s.i.g. is adequate. The pressure is maintained for approximately 30 seconds. The test pressure exceeds any pressure likely to be encountered in use by at least 50 percent. If the tube 10 sustains the test pressure for the period indicated, then the tube 10 is ready for packaging and shipment to the customer.

Operation

Although the overall operation of the tube-making apparatus according to the invention will be apparent from the foregoing description, certain guidelines should be followed in operating the apparatus. Generally speaking, the smaller the diameter of the tubes 10, and the thinner the side walls of the tubes 10, then the faster the line can be operated. Conversely, larger tubes and/or thicker-walled tubes will require longer processing times. To produce a tube having a finished nominal outside diameter of 0.500 inch, and a side wall thickness of 0.060 inch, the following conditions apply:

1. Extrusion of the tube 10 should be on the order of 4.9 inches per minute. It is expected that extrusion rates of up to about 12 inches per minute can be attained, if desired. The nominal outside diameter of the tube 10 is about 0.615 inch when newly extruded.

2. A tapered graphite threading plug is inserted into the forward end of the tube 10 to assist in guiding the tube 10 through the line. Each of the elements described previously such as the calciner 20 includes a conical entrance guide (not shown) in order to assist in initially threading the tube 10 through the tube-making apparatus.

3. In order to provide a proper cushion of air in the tube guide 14, the openings in the porous plugs 84 must be sized correctly. If the openings are too large, too much flow would be required for proper performance. If the openings are too small, portions of the tube 10 will not be supported or else holes in the tube wall will be created. The plugs 84 should have openings with diameters on the order of 5 microns for best performance.

Figure 22:
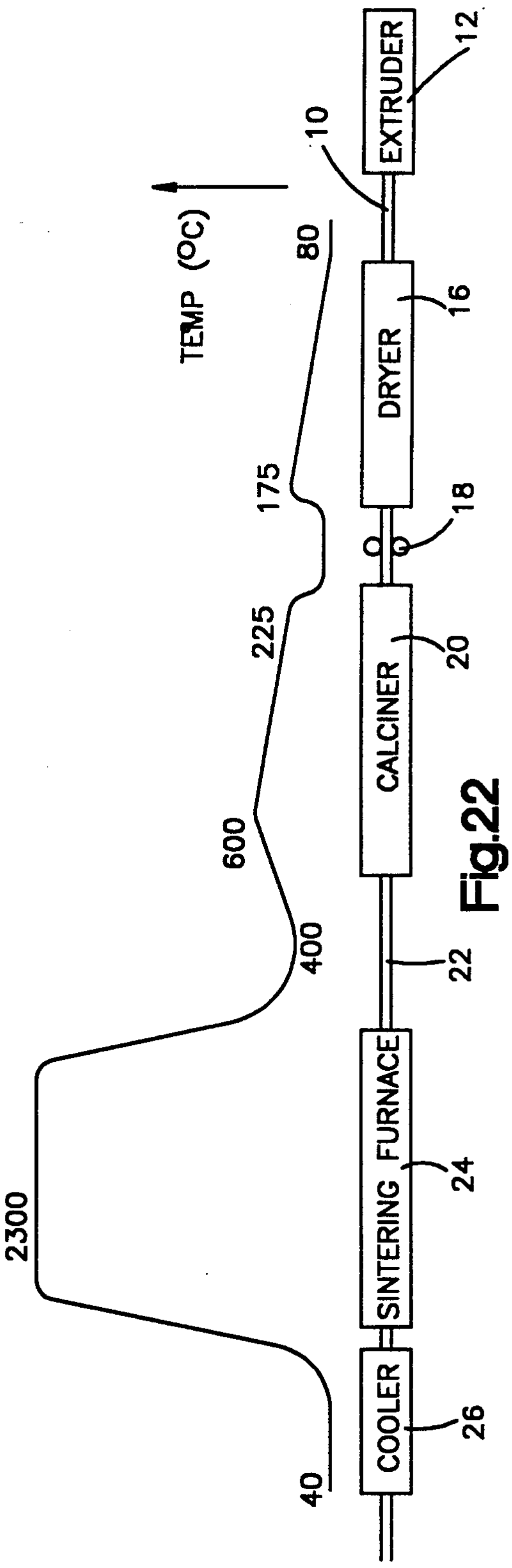
FIG. 22 is a graph showing the temperature of tubes manufactured according to the invention as a function of the location of the tubes during the manufacturing process.

4. As illustrated, the dryer 16 is approximately 103 inches long. The air supply temperature is approximately 175° C. at a pressure of about 5-10 p.s.i.g. The flow rate of the heated air is about 500 s.c.f.h. As shown in FIG. 22, the inlet temperature of the dryer 16 is about 80° C. The temperature climbs smoothly to an exit temperature of about 175° C.

If the temperature in the dryer 16 is too high, the tube 10 will be blistered. If the temperature is too low, the tube 10 will not be dried, and it will be damaged by the pinch rolls 18. The length of the dryer 16 is a function of the desired line speed and the wall thickness of the tube 10. If the flow rate of the drying gas is too high, it can create holes in the tube wall. If the flow rate is too low, the tube 10 will not float on a cushion of air, but rather will drag.

5. The first pinch rolls 18 apply a very low axial tension to the tube 10. It has been found that the first pinch rolls 18 should have a surface speed of about 2% faster than the spped of the tube 10 as it emerges from the dryer 16 to prevent buckling of the newly extruded tube 10. The speed of the pinch rolls 18 must be controlled carefully, however, because the tube 10 will break at approximately 6% overspeed. If the pinch rolls 18 are controlled properly, they can be used to slightly adjust the diameter of the tube 10.

6. The calciner 20 is approximately 84 inches long. The heating elements 144 cause the liner temperature in the center of the downstream hot zone to be about 600° C. At this temperature, the organic material in the tube 10 decomposes and is vaporized. Approximately 1 foot inside the calciner 20 the temperature reaches about 200°-225° C. The temperature gradient inside the calciner 20 (see FIG. 22) prevents oxidation of the tube 10 by increasing the distance between the hot zone and the room atmosphere at the entrance to the calciner 20. The temperature gradient also is relatively gradual to avoid blistering the tube 10.

If the calcining temperature is too hot, the tube 10 will be subjected to accelerated oxidation in the calciner, causing poor final quality. If the calcining temperature is too low, incomplete calcining will occur. As with the dryer 16, the length of the calciner 20 is related to the tube wall thickness and the line speed.

7. As the tube 10 enters the sintering furnace 24, the temperature rises rapidly from about 400° C. to the maximum temperature of about 2250°-2300° C. without about 12 inches of tube travel. The maximum temperature is selected as a function of the composition of the tube 10 being sintered and the inert gas that is used. Argon permits lower temperatures, while nitrogen requires higher temperatures (with silicon carbide tubes). It is preferable to sinter the tube 10 at a lower temperature for a longer period of time in order to prevent excessive grain growth of the tube 10.

Periodically, about every 2–4 weeks, the furnace 24 is charged with powdered boron carbide on the bottom of the box 164. A boron-containing gas is formed at sintering temperature that surrounds the tube 10 and aids sintering.

At a line speed of 4.9 inches per minute, maximum temperature is attained within less than three minutes. As the tube 10 attains maximum temperature, it becomes sintered. The tube 10 shrinks in length approximately 18 percent. The tube guide 172 maintains proper contact with the tube 10 and assures tubes straightness during the sintering process.

It is important that the tube 10 stay at maximum temperature long enough to ensure proper sintering action. The minimum time believed to be adequate for attaining adequate sintering action is about 6–10 minutes. In order to attain adequate residence time in the sintering furnace 24 at the line speed selected, the heating zone in the sintering furnace 24 is about 50 inches long.

The oxygen level in the sintering furnace 24 is maintained at about 7–15 parts per million during operation. The approximate furnace steady-state power consumption is about 20 kw, and heat-up time is about two hours after an inert gas pre-purge cycle. The heating elements 176 are operated at about 55 volts AC maximum.

If necessary or desired, the tube 10 can be maintained at maximum temperature for about 2 hours without damage. If damage occurs, it will be in the nature of undesired grain growth. The fact that the tube 10 can be maintained at maximum temperature for a long period of time means that the line can be slowed down if necessary to very low speeds on the order of 0.5 inch per minute or even 0.25 inch per minute.

At the entrance to the sintering furnace 24, a slow condensation build-up of silicon plus $SiO_2$ will occur from the silicon-bearing gas species generated within the furnace 24. This condensation is believed to occur as the gas cools upon leaving the furnace 24 and requires occasional removal (about every week or two) from the bore surrounding the tube 10.

It has been found that the tube guide 172 experiences no appreciable wear. This is believed to be a result of low friction imparted by the tube 10, as well as a result of wear-resistant deposits that form on the inner diameter of the tube guide 172.

As the tube 10 exits the sintering furnace 24, it will be traveling at a lower rate of speed due to shrinkage. The exit speed typically is about 4 inches per minute. As the tube 10 passes through the cooler 28, it is cooled rapidly to approximately 40° C. This rapid chilling of the tube 10 has not been found to be harmful to the tube 10.

8. As the tube 10 passes through the exit tube guide 28, the tube guide 28 is adjusted as described previously to straighten the tube as much as possible. It has been found that tube straightness is governed primarily by the geometry of the sintering furnace tube guide 172, the adjustment of the exit tube guide 28, and the tension applied by the second pinch rolls 30. The exit tube guide 28 should be relatively far from the end of the sintering furnace 24 (about 5 feet) in order to ensure a long moment arm for bending the tube 10 as may be necessary.

9. During the cut-off operation, the vacuum blower 76 is deactivated to avoid drawing air into the tube 10. As the tube 10 passes the cut-off mechanism 32, one of the hoses 342, 346 is connected to the end of the tube 10. Inert gas is pumped under pressure into the tube 10. Simultaneously, the vacuum blower 76 is activated in order to draw the inert gas and volatiles produced by the tube 10 through the interior of the tube 10, through the mandrel 60, and out of the extruder 12 for disposition. The reading on the vacuum gauge 70 should be maintained at approximately 8–15 inches of water. The flow rate as measured by the flowmeter 74 should be approximately 20–40 s.c.f.h. It has been found that the blower 76 need to have a rating of at least 50 inches of water in order to overcome all pressure drops throughout the system.

The throttle valve 78 occasionally is adjusted to maintain desired readings as the trap 72 accumulates liquids and solids. Dilution air is added as needed to cool the blower 76 and to permit control of the desired vacuum level. It has been found that too high a vacuum level, for example 35 inches of water (for a 0.060 sintered wall thickness), can collapse the tube 10 immediately downstream of the extruder 12.

A fully charged extruder 12 can produce approximately 140 lineal feet of finished tube having the dimensions previously described. Approximately 20 feet of finished ceramic tube can be produced each hour. It has been found that about 3 pounds of extrudable mixture will yield about 20 feet of finished ceramic tube of these dimensions. A certain portion of the tube 10 must be scrapped due to a lack of internal inert gas being available. Nevertheless, even taking into account scrap that occurs at the head and tail ends of a long run, very good yields on the order of 90% or more of high quality ceramic tube can be produced.

The invention as illustrated shows only a single tube 10 being produced, but it is expected that a number of small tubes 10 may be produced in multiple simultaneous strands, provided that relatively large spaces, for example 5 diameters or more, are left between individual strands.

The tube-making apparatus is equipped with suitable automatic controls, such controls being known to those skilled in the art and not requiring further description here other than the description that has been provided already. Upon loading a new billet into the extruder 12, it is expected that the newly loaded billet will "weld" itself to the previous billet within the bore 38. Reloading of a new ceramic billet will require stopping the extrusion of the tube 10 for only a minute or two and should not affect the quality of the tubes 10 being extruded.

If it is desired to manufacture tubes from oxide ceramics instead of the preferred alpha silicon carbide, then two options are possible: (1) the equipment may remain as previously described and the operating parameters, chiefly the sintering furnace temperature, may be adjusted as appropriate for the material being processed, or (2) the sintering furnace 24 could be replaced by a conventional, relatively long tube furnace having either $MOSi_2$ heating elements for use up to about 1700° C., or silicon carbide heating elements for use up to about 1500° C. and oxide-ceramic fiber insulation. The second option would permit air to be used both inside and outside the tube and could lead to a simpler and lower cost variant of the invention for oxide-ceramic tubes that can be sintered below about 1700° C. These materials would include zirconia, alumina, or mullite. If the second option is selected, a furnace liner tube suitable for operation in air up to about 1600° C. could be used; a suitable material would be sintered silicon carbide.

The tube-making apparatus according to the invention enables extremely long ceramic tubes to be produced on a more or less continuous basis. The tubes can have a wide variety of cross-sectional shapes and wall thicknesses. The tubes can be manufactured extremely straight, with excellent control over symmetry and wall thickness. The present invention minimizes or eliminates damage from frequent tube handling, improves processing symmetry, permits rapid feedback as part of the manufacturing process, and avoids the high capital cost of conventional tube-manufacturing equipment.

Although the invention has been described in its preferred form with a certain degree of particularity, it will be apparent that various changes and modifications can be made without departing from the true spirit and scope of the invention as hereinafter claimed. It is expected that the patent will cover all such changes and modifications. It also is intended that the patent shall cover, by suitable expression in the appended claims, whatever features of patentable novelty exist in the invention disclosed.

What is claimed is:

1. Apparatus for manufacturing ceramic tubes from a mixture including ceramic powder, comprising:

an extruder adapted to receive the mixture, the extruder having a die of a pre-determined cross-section through which the mixture can be extruded to form a tube, the movement of the tube establishing a path of travel;

a dryer disposed downstream of the extruder, the dryer having a through opening through which the tube can be moved, the dryer having a longitudinally extending tube guide that supports the tube during its passage through the dryer;

a calciner disposed downstream of the dryer, the calciner having a through opening through which the tube can be moved, the calciner having a longitudinally extending tube guide that supports the tube during its passage through the calciner;

a sintering furnace disposed downstream of the calciner, the sintering furnace having a through opening through which the tube can be moved, the sintering furnace having a longitudinally extending tube guide that supports the tube during its passage through the sintering furnace;

a cooler disposed downstream of the sintering furnace, the cooler having a through opening through which the tube can be moved, the cooler having a longitudinally extending tube guide that supports the tube during its passage through the cooler; and means for cutting the tube, the means for cutting the tube being disposed downstream of the cooler.

2. The apparatus of claim 1, further comprising means for maintaining an inert atmosphere within the tube.

3. The apparatus of claim 1 further comprising means for maintaining an inert atmosphere around the tube during its passage through the calciner and the sintering furnace.

4. The apparatus of claim 1, further comprising means for applying tension to the tube.

5. The apparatus of claim 4, wherein the means for applying tension to the tube includes first pinch rolls for engaging the tube, the first pinch rolls being disposed downstream of the dryer.

6. The apparatus of claim 5, further comprising second pinch rolls for engaging the tube, the second pinch rolls being disposed downstream of the cooler.

7. The apparatus of claim 1, further comprising means for supporting the tube on a cushion of air downstream of the extruder and upstream of the dryer.

8. The apparatus of claim 7, wherein the means for supporting the tube on a cushion of air is in the form of a trough having small openings along its length.

9. The apparatus of claim 1, wherein the means for cutting includes a clamp disposed adjacent the tube, the clamp adapted to grip the tube and move with the tube in the direction of travel of the tube.

10. The apparatus of claim 1, wherein the longitudinally extending tube guide included as part of the sintering furnace is sized such that the tube passes therethrough in closely spaced relationship.

11. The apparatus of claim 10, wherein the tube guide has a larger diameter upstream section, a smaller diameter downstream section, and a beveled transition region connecting the upstream and downstream sections.

12. The apparatus of claim 11, wherein the transition area is located at about that location in the sintering furnace where the tube shrinks in diameter upon sintering.

13. The apparatus of claim 10, wherein the centerline of the tube guide is aligned with the longitudinal axis of the tube being extruded.

14. The apparatus of claim 10, wherein the tube guide is made of graphite.

15. The apparatus of claim 1, further comprising means for applying deflective forces on the tube, the means for applying deflective forces being disposed downstream of the sintering furnace.

16. The apparatus of claim 15, wherein the means for applying deflective forces is in the form of a tube guide through which the tube passes in closely spaced relationship, the tube guide being adjustable radially relative to the centerline of the tube.

17. Apparatus for manufacturing ceramic tubes from a mixture including ceramic powder, comprising:

an extruder adapted to receive the mixture, the extruder having a die of a pre-determined cross-section through which the mixture can be extruded to form a tube, the movement of the tube establishing a path of travel;

a dryer disposed downstream of the extruder, the dryer having a through opening through which the tube can be moved;

first pinch rolls disposed downstream of the dryer for engaging the tube and applying tension to the tube;

a calciner disposed downstream of the first pinch rolls, the calciner having a through opening through which the tube can be moved;

a sintering furnace disposed downstream of the calciner, the sintering furnace having a through opening through which the tube can be moved;

a cooler disposed downstream of the sintering furnace, the cooler having a through opening through which the tube can be moved;

second pinch rolls disposed downstream of the cooler for engaging the tube and applying tension to the tube; and means for cutting the tube, the means for cutting the tube being disposed downstream of the second pinch rolls.

18. The apparatus of claim 17, further comprising means for maintaining an inert atmosphere within the tube.

19. The apparatus of claim 17, further comprising means for maintaining an inert atmosphere around the tube during its passage through the calciner and the sintering furnace.

20. The apparatus of claim 17, further comprising means for supporting the tube on a cushion of air downstream of the extruder and upstream of the dryer.

21. The apparatus of claim 20, wherein the means for supporting is in the form of a trough having small openings along its length.

22. The apparatus of claim 17, wherein the means for cutting includes a clamp disposed adjacent the tube, the clamp having means to grip the tube and move with the tube in the direction of travel of the tube.

23. The apparatus of claim 17, wherein the sintering furnace includes a longitudinally extending tube guide through which the tube passes in closely spaced relationship.

24. The apparatus of claim 23, wherein the tube guide has a larger diameter upstream section, a smaller diameter downstream section, and a beveled transition region connecting the upstream and downstream sections.

25. The apparatus of claim 24, wherein the transition area is located at about that location in the sintering furnace where the tube shrinks in diameter upon sintering.

26. The apparatus of claim 23, wherein the centerline of the tube guide is aligned with the longitudinal axis of the tube being extruded.

27. The apparatus of claim 23, wherein the tube guide is made of graphite.

28. Apparatus for manufacturing ceramic tubes from a mixture including ceramic powder, comprising:

an extruder adapted to receive the mixture, the extruder having a die of a pre-determined cross-section through which the mixture can be extruded to form a tube, the movement of the tube establishing a path of travel;

a dryer disposed downstream of the extruder, the dryer having a through opening through which the tube can be moved;

a calciner disposed downstream of the dryer, the calciner having a through opening through which the tube can be moved;

a sintering furnace disposed downstream of the calciner, the sintering furnace having a through opening through which the tube can be moved;

a cooler disposed downstream of the sintering furnace, the cooler having a through opening through which the tube can be moved;

means for cutting the tube, the means for cutting the tube being disposed downstream of the cooler, the means for cutting including a clamp disposed adjacent the tube, the clamp disposed adapted to grip the tube and move with the tube in the direction of travel of the tube.

29. The apparatus of claim 28, further comprising means for maintaining an inert atmosphere within the tube.

30. The apparatus of claim 28, further comprising means for maintaining an inert atmosphere around the tube during its passage through the calciner and the sintering furnace.

31. The apparatus of claim 28, further comprising means for applying tension to the tube.

32. The apparatus of claim 31, wherein the means for applying tension to the tube includes first pinch rolls for engaging the tube, the first pinch rolls being disposed downstream of the dryer.

33. The apparatus of claim 32, further comprising second pinch rolls for engaging the tube, the second pinch rolls being disposed downstream of the cooler.

34. The apparatus of claim 28, further comprising means for supporting the tube on a cushion of air downstream of the extruder and upstream of the dryer.

35. The apparatus of claim 34, wherein the means for supporting is in the form of a trough having small openings along its length.

36. The apparatus of claim 28, wherein the sintering furnace includes a longitudinally extending tube guide through which the tube passes in closely spaced relationship.

37. The apparatus of claim 36, wherein the tube guide has a larger diameter upstream section, a smaller diameter downstream section, and a beveled transition region connecting the upstream and downstream sections.

38. The apparatus of claim 37, wherein the transition area is located at about that location in the sintering furnace where the tube shrinks in diameter upon sintering.

39. The apparatus of claim 36, wherein the centerline of the tube guide is aligned with the longitudinal axis of the tube being extruded.

40. The apparatus of claim 36, wherein the tube guide is made of graphite.

* * * * *